(12) United States Patent
Lasecki et al.

(10) Patent No.: US 9,096,380 B2
(45) Date of Patent: Aug. 4, 2015

(54) CONVEYOR BELT WITH ALIGNMENT FEATURES

(71) Applicant: Ashworth Bros., Inc., Winchester, VA (US)

(72) Inventors: Jonathan R. Lasecki, Strasburg, VA (US); Darroll Joseph Neely, Gerrardstown, WV (US)

(73) Assignee: Ashworth Bros., Inc., Fall River, MA (US)

( * ) Notice: Subject to any disclaimer, the term of this patent is extended or adjusted under 35 U.S.C. 154(b) by 0 days.

(21) Appl. No.: 14/266,194

(22) Filed: Apr. 30, 2014

(65) Prior Publication Data

US 2014/0311877 A1    Oct. 23, 2014

Related U.S. Application Data

(63) Continuation of application No. 13/311,754, filed on Dec. 6, 2011, now Pat. No. 8,752,698.

(51) Int. Cl.
*B65G 15/32* (2006.01)
*B65G 17/08* (2006.01)
(Continued)

(52) U.S. Cl.
CPC .............. *B65G 15/32* (2013.01); *B65G 17/064* (2013.01); *B65G 17/08* (2013.01); *B65G 17/38* (2013.01); *B65G 2207/12* (2013.01); *B65G 2812/02396* (2013.01); *Y10T 29/49947* (2015.01)

(58) Field of Classification Search
CPC ...................... B65G 17/38; B65G 2812/02396; B65G 17/064; B65G 17/08; B65G 15/32; B65G 2207/12; Y10T 29/49947

USPC .................................... 198/848–849, 851–83
See application file for complete search history.

(56) References Cited

U.S. PATENT DOCUMENTS

| 1,119,262 | A | 12/1914 | Fraser |
| 2,138,317 | A | 11/1938 | Weiss |
| 3,628,834 | A | 12/1971 | Anderson |

(Continued)

FOREIGN PATENT DOCUMENTS

| CN | 101218158 A | 7/2008 |
| WO | 9101261 | 2/1991 |

OTHER PUBLICATIONS

International Search Report and Written Opinion mailed Mar. 22, 2013 in International Application No. PCT/US2012/068255.

(Continued)

*Primary Examiner* — Mark A Deuble
(74) *Attorney, Agent, or Firm* — Plumsea Law Group, LLC

(57) ABSTRACT

A conveyor belt includes a first link having a first protrusion with a first mating surface that is curved. The first protrusion is disposed proximate a first rod receiving aperture of the first link. The belt also includes a second link having a second protrusion with a second mating surface that is curved. The second protrusion is disposed proximate a second rod receiving aperture of the second link. The first mating surface receives and abuts the second mating surface. The second link is restrained against movement in less than three orthogonal directions relative to the first link due to abutment of the first and second mating surfaces. The first and second rod receiving apertures are aligned when the first and second mating surfaces abut. Additionally, the belt includes a connecting rod extending through the first and second rod receiving apertures.

20 Claims, 25 Drawing Sheets

(51) Int. Cl.
  *B65G 17/38* (2006.01)
  *B65G 17/06* (2006.01)

(56) References Cited

U.S. PATENT DOCUMENTS

| | | | |
|---|---|---|---|
| 3,771,642 | A | 11/1973 | Schatte |
| 3,881,593 | A | 5/1975 | Mushovic et al. |
| 4,050,323 | A | 9/1977 | I'Anson |
| 4,330,898 | A * | 5/1982 | Thompson et al. ........ 15/250.32 |
| 4,556,142 | A | 12/1985 | Lapeyre |
| 4,846,339 | A | 7/1989 | Roinestad |
| 4,886,158 | A | 12/1989 | Lapeyre |
| 5,816,390 | A | 10/1998 | Stebnicki |
| 5,850,902 | A | 12/1998 | Hicks et al. |
| 5,954,188 | A | 9/1999 | Etherington et al. |
| 6,006,898 | A | 12/1999 | Odink |
| 6,371,284 | B1 | 4/2002 | Pasch |
| 6,382,405 | B1 | 5/2002 | Palmaer |
| 6,581,758 | B1 | 6/2003 | van-Zijderveld et al. |
| 6,604,625 | B2 | 8/2003 | Greve |
| 6,615,979 | B2 | 9/2003 | Etherington et al. |
| 6,705,460 | B2 | 3/2004 | Weiser et al. |
| 7,073,662 | B2 | 7/2006 | Neely et al. |
| 7,278,535 | B2 | 10/2007 | Damkjaer |
| 7,331,447 | B2 | 2/2008 | Krisl et al. |
| 8,752,698 | B2 | 6/2014 | Lasecki et al. |
| 2008/0105519 | A1 | 5/2008 | Harrison |
| 2009/0212559 | A1 | 8/2009 | Werth |
| 2010/0282577 | A1 | 11/2010 | Rettore et al. |
| 2011/0278136 | A1 | 11/2011 | Weiser et al. |
| 2013/0140148 | A1 | 6/2013 | Lasecki et al. |

OTHER PUBLICATIONS

Office Action dated Apr. 30, 2013 in U.S. Appl. No. 13/311,783, filed Dec. 6, 2011.
Office Action dated Nov. 14, 2013 in U.S. Appl. No. 13/311,783, filed Dec. 6, 2011.
Office Action dated Feb. 6, 2014 in U.S. Appl. No. 13/311,783, filed Dec. 6, 2011.
Office Action issued on Apr. 24, 2015 for Chinese Application No. 201280069158.3 (19pp).

* cited by examiner

CONVEYOR BELT WITH ALIGNMENT FEATURES

CROSS REFERENCE TO RELATED APPLICATION

This application is a continuation of co-pending application Ser. No. 13/311,754, filed Dec. 6, 2011, the disclosure of which is hereby incorporated by reference in its entirety.

FIELD OF THE INVENTION

The embodiments herein are directed to modular conveyor belts and, more particularly, to conveyor belt link structures having alignment features and methods of assembling such conveyor belts.

BACKGROUND

Conveyor belts are widely used today in a variety of industrial applications. For example, conveyor belts are used for material handling and processing applications, as well as a variety of food processing systems.

Since conveyor belt use is widespread, an economical and efficient way of manufacturing conveyor belts is necessary to meet this growing demand. One type of belt provided to increase cost-effectiveness and installation efficiencies are modular belts. Modular conveyor belts are made from many individual links, or belt segments, that are connected together to form a conveyor belt having a desired total length. In order to assemble a modular conveyor belt, the modular links are carefully aligned in relation to one another so that a connecting rod can be inserted into rod receiving apertures that extend through the modular links. Typically, each modular link has a rod receiving aperture through which a connecting rod may be inserted. However, before the connecting rod can be inserted, the rod receiving aperture in a first modular link needs to be aligned with the rod receiving aperture in a second modular link so that the connecting rod may be inserted through both links. This process is repeated for each link until all the modular links are held in place in relation to one another to form a complete conveyor belt.

In some circumstances, aligning two adjacent modular links in order to insert the connecting rod through the rod receiving apertures in the links may be an arduous and time-consuming process. In some cases, it may be time intensive to carefully position two adjacent links so that the rod may be properly inserted. One reason this may be difficult is that the belt components may be flexible due to an elongated length. Another factor that may contribute to the flexibility of the belt components is the material that the belt components are formed of. Plastic belt links can sometimes be more flexible than metal links. Similarly, the connecting rod may also be flexible, particularly when a plastic rod is used and/or when the belt is particularly wide, necessitating the use of a relatively long rod.

The present disclosure is directed to improvements in alignment and assembly of modular conveyor belt components.

SUMMARY

In one aspect, the present disclosure is directed to a conveyor belt. The conveyor belt may include a first link having a first protrusion extending a first distance from a surface of the first link. The first protrusion may include a first mating surface. The first protrusion is disposed proximate a first rod receiving aperture extending through the first link. In addition the conveyor belt may include a second link having a second protrusion extending a second distance from a surface of the second link. The second protrusion may include a second mating surface, wherein the second protrusion is disposed proximate a second rod receiving aperture extending through the second link. The first mating surface of the first protrusion may be disposed in a mating relationship with the second mating surface of the second protrusion. Further, the conveyor belt may include a connecting rod extending through the first rod receiving aperture of the first link and the second rod receiving aperture of the second link.

In another aspect, the present disclosure is directed to a modular conveyor belt. The conveyor belt may include a first link having a first rod receiving aperture and a first protrusion extending a first distance from a surface of the link. A first mating surface of the first protrusion may be located a predetermined distance from the first rod receiving aperture. In addition, the first mating surface of the first protrusion may be configured to abut a portion of a second link including a second rod receiving aperture. When the first protrusion abuts the portion of the second link, the first rod receiving aperture may be substantially aligned with the second rod receiving aperture to form a rod receiving path.

In another aspect, the present disclosure is directed to a method of assembling a conveyor belt. The method may include providing a first link having a first protrusion, wherein the first protrusion is positioned proximate a first rod receiving aperture extending through the first link, wherein the first protrusion extends a first distance from a first surface of a first leg of the first link, and wherein the first protrusion has a first mating surface extending away from the first surface. The method may also include providing a second link having a second protrusion, wherein the second protrusion is positioned proximate a second rod receiving aperture extending through the second link, wherein the second protrusion extends a second distance from a second surface of a second leg of the second link, and wherein the second protrusion has a second mating surface extending away from the second surface. In addition, the method may include aligning the first receiving aperture with the second rod receiving aperture by moving the first link toward the second link until the first mating surface of the first protrusion abuts the second mating surface of the second protrusion.

In another aspect, the present disclosure is directed to a conveyor belt. The conveyor belt may include a first link having a recess in a surface of the first link, wherein the recess includes a first mating surface, and wherein the recess is disposed proximate a first rod receiving aperture extending through the first link. In addition, the conveyor belt may include a second link having a protrusion extending a second distance from a surface of the second link. The protrusion may include a second mating surface, wherein the protrusion is disposed proximate a second rod receiving aperture extending through the second link. When the protrusion is engaged with the recess, the first mating surface of the recess abuts the second mating surface of the protrusion.

In another aspect, the present disclosure is directed to a modular conveyor belt. The conveyor belt may include a first link having a first rod receiving aperture and a frangible tab extending from a surface of the first link. The frangible tab may include a first mating surface located a predetermined distance from the first rod receiving aperture. The first mating surface of the frangible tab may be configured to abut a portion of a second link including a second rod receiving aperture. In addition, when the first protrusion abuts the portion of the second link, the first rod receiving aperture may be substantially aligned with the second rod receiving aperture to form a rod receiving path.

In another aspect, the present disclosure is directed to a method of assembling a modular conveyor belt. The method may include providing a first link having a first rod receiving aperture and a frangible tab extending from a surface of the first link, the frangible tab including a first mating surface located a predetermined distance from the first rod receiving aperture. The method may also include providing a second link including a second rod receiving aperture. In addition, the method may include abutting a portion of the second link against the first mating surface of the frangible tab, thereby causing the first rod receiving aperture to be substantially aligned with the second rod receiving aperture to form a rod receiving path.

In another aspect, the present disclosure is directed to a modular conveyor belt. The conveyor belt may include a first link having a first rod receiving aperture and a receiving member disposed at a predetermined distance from the first rod receiving aperture. The receiving member may include a first mating surface. In addition, the conveyor belt may include a second link having a second rod receiving aperture and a longitudinally oriented frangible tab extending from a surface of the second link. The frangible tab may include a second mating surface located a predetermined distance from the second rod receiving aperture. The receiving member may be configured to receive the frangible tab. In addition, when the frangible tab is received within the receiving member, the first rod receiving aperture may be substantially aligned with the second rod receiving aperture to form a rod receiving path.

In another aspect, the present disclosure is directed to a method of assembling a modular conveyor belt. The method may include providing a first link having a first rod receiving aperture and a receiving member disposed at a predetermined distance from the first rod receiving aperture, the receiving member including a first mating surface. The method may also include providing a second link having a second rod receiving aperture and a longitudinally oriented frangible tab extending from a surface of the second link, the frangible tab including a second mating surface located a predetermined distance from the second rod receiving aperture. In addition, the method may include associating the first link with the second link such that the frangible tab of the second link is received within the receiving member of the first link and the first mating surface of the first link is abutting the second mating surface of the second link, thereby substantially aligning the first rod receiving aperture with the second rod receiving aperture to form a rod receiving path.

In another aspect, the present disclosure is directed to conveyor belt. The conveyor belt may include a first link having a first mating surface, wherein the first mating surface is disposed proximate a first rod receiving aperture extending through at least a portion of the first link. The conveyor belt may also include a second link having a second mating surface, wherein the second mating surface is disposed proximate a second rod receiving aperture extending through at least a portion of the second link, wherein the first mating surface is disposed in a mating relationship with the second mating surface, and wherein, when the first mating surface abuts the second mating surface, the first rod receiving aperture is substantially aligned with the second rod receiving aperture to form a rod receiving path.

In another aspect, a conveyor belt is disclosed that includes a first link having a first protrusion extending a first distance from a first surface of the first link. The first protrusion includes a first mating surface, and the first mating surface is curved. The first protrusion is disposed proximate a first rod receiving aperture extending through the first link. The conveyor belt also includes a second link having a second protrusion extending a second distance from a second surface of the second link. The second protrusion includes a second mating surface, and the second mating surface is curved. The second protrusion is disposed proximate a second rod receiving aperture extending through the second link. The first mating surface of the first protrusion receives and abuts the second mating surface of the second protrusion. The second link is restrained against movement in less than three orthogonal directions relative to the first link due to abutment of the first mating surface and the second mating surface. The first rod receiving aperture and the second rod receiving aperture are aligned when the first mating surface abuts the second mating surface. Additionally, the conveyor belt includes a connecting rod extending through the first rod receiving aperture of the first link and the second rod receiving aperture of the second link.

In another aspect, a conveyor belt is disclosed that includes a first link that is at least partially U-shaped to be at least partially defined by a first leg, a second leg, and a first connecting portion extending between the first leg and the second leg of the first link. The first link further includes a first rod receiving aperture. The conveyor belt also includes a second link that is at least partially U-shaped to be at least partially defined by a third leg, a fourth leg, and a second connecting portion extending between the third leg and the fourth leg of the second link. The second link further includes a second rod receiving aperture. Moreover, the conveyor belt includes a connecting rod extending through the first rod receiving aperture of the first link and the second rod receiving aperture of the second link to connect the first link and the second link. The first link and the second link are configured for movement in a longitudinal direction. The first link includes a first protrusion extending from a first surface of the first link. The first protrusion includes a first mating surface, and the first mating surface is curved. The first mating surface of the first protrusion receives and abuts a second surface of the second link to limit movement of the second link toward the first link in the longitudinal direction. The first mating surface of the first protrusion receives and abuts the second surface of the second link to align the first and second rod receiving apertures.

In another aspect, a conveyor belt is disclosed that includes a first link having a first protrusion extending a first distance from a first surface of the first link. The first protrusion includes a first mating surface, and the first mating surface is curved. The first protrusion is disposed proximate a first rod receiving aperture extending through the first link. The conveyor belt also includes a second link having a second protrusion extending a second distance from a second surface of the second link. The second protrusion includes a second mating surface, and the second mating surface is curved. The second protrusion is disposed proximate a second rod receiving aperture extending through the second link. The second mating surface and the first mating surface abut to align the first rod receiving aperture and the second rod receiving aperture. The second mating surface and the first mating surface have corresponding curvature. The second link is restrained against movement in less than three orthogonal directions relative to the first link due to abutment of the first mating surface and the second mating surface. The conveyor belt additionally includes a connecting rod extending through the first rod receiving aperture of the first link and the second rod receiving aperture of the second link.

Other systems, methods, features and advantages of the current embodiments will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The current embodiments can be better understood with reference to the following drawings and description. The components in the figures are not necessarily to scale, emphasis instead being placed upon illustrating the principles of the current embodiments. Moreover, in the figures, like reference numerals designate corresponding parts throughout the different views.

DETAILED DESCRIPTION

The present disclosure describes systems and methods for aligning the modular links of a conveyor belt for assembly.

Embodiments provide systems and methods for aligning rod receiving apertures of adjacent links to facilitate insertion of retaining rods. The presently disclosed conveyor belt concepts, such as rod alignment features, are generally applicable to a wide range of modular conveyor belt configurations.

Figure 1:
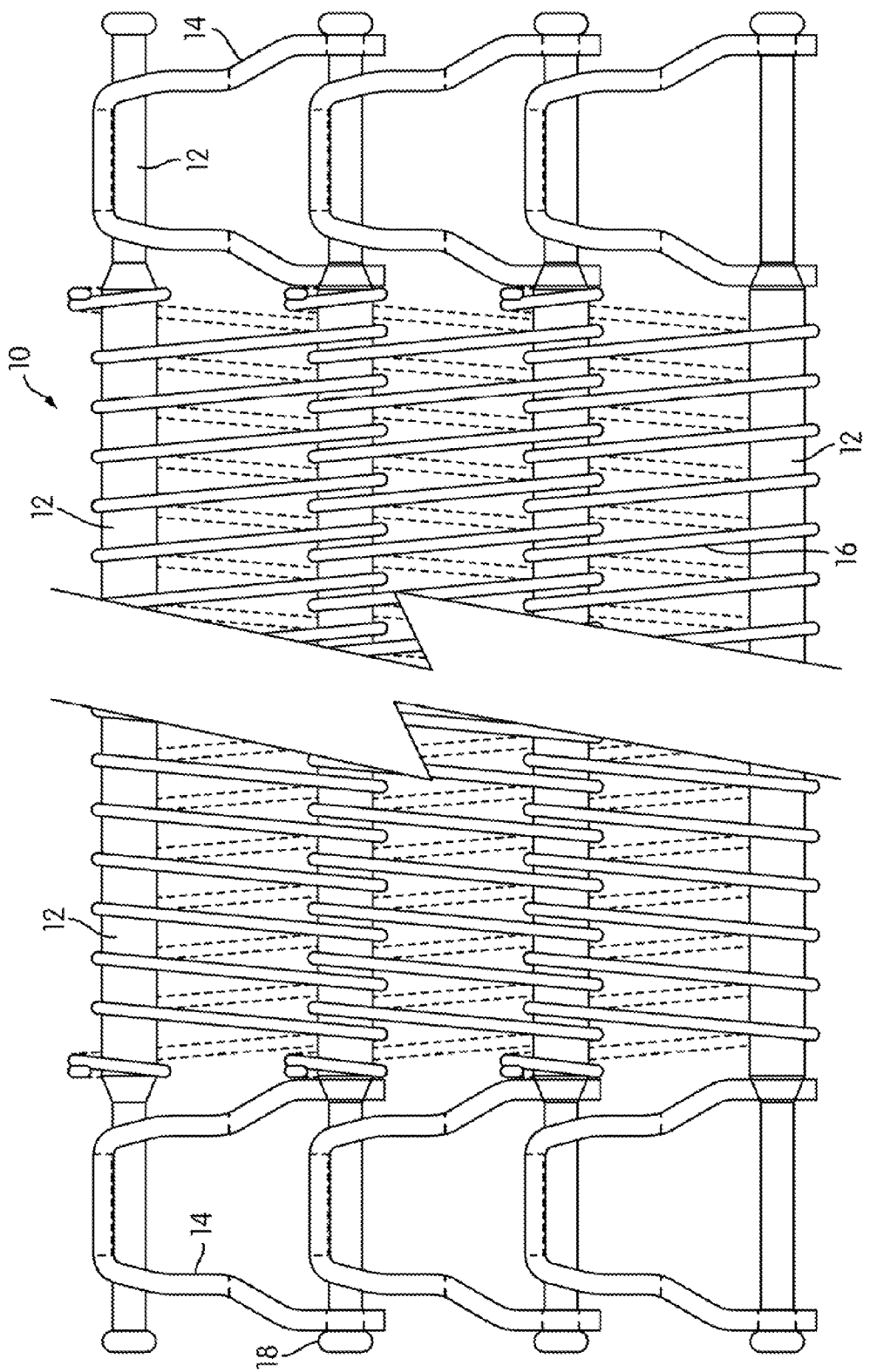
FIG. 1 is an illustration of an exemplary modular conveyor belt.

Examples of basic conveyor belt structures and manufacturing methods can be found in U.S. Pat. No. 5,954,188, which is incorporated herein by reference. The accompanying FIG. 1 corresponds to FIG. 1 of the '188 patent, and illustrates a typical prior art modular conveyor belt 10. Conveyor belt 10 includes rods 12 connected by links 14 and covered by a mesh 16 to provide additional support for the goods transported on conveyor belt 10.

In some cases, a buttonhead 18 may be formed on the ends of rods 12 to act as a stop for links 14. A weld is also typically formed between buttonhead 18 and link 14 for a stronger and more secure connection between rods 12 and links 14. In other cases, a buttonless configuration may be employed, wherein the rod is welded to the link without creating a significant protrusion beyond the leg of the link.

Figure 2:
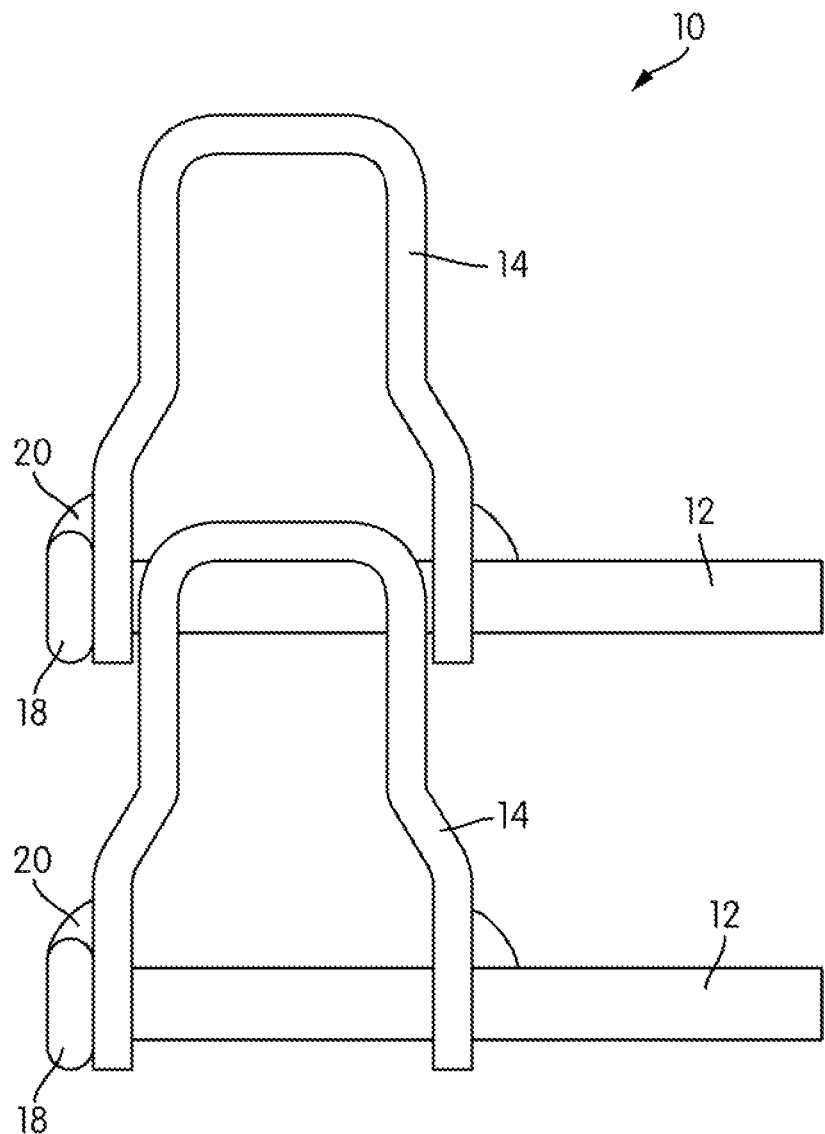
FIG. 2 is an enlarged view of a portion of the conveyor belt shown in FIG. 1.

FIG. 2 shows an enlarged view of a portion of prior art conveyor belt 10, showing rods 12 formed with buttonheads 18. In addition, FIG. 2 also shows a weld 20 fastening buttonhead 18 and, therefore, rod 12, to link 14.

The term "conveyor belt," as used in the present disclosure, generally refers to any type of endless track or belt, typically configured to be driven by a geared mechanism or drum. The term "conveyor belt" should not be considered to be limited to any particular type of conveyor belt unless otherwise specified herein.

The directional term "lateral" or "laterally," as used in the present disclosure, refers to an outwardly direction relative to the centerline of the entire conveyor belt. A lateral link may be considered the end link or terminal link of a row.

The term "longitudinal" as used in the present disclosure and claims refers to a direction in which the conveyor belt travels. Further the term longitudinal refers to both forward and backward directions of conveyor belt travel.

The term "vertical," as used in the present disclosure and claims refers to the up and down direction relative to the ground.

The conveyor belt systems, and methods of building such systems, as described herein, may include different types of conveyor belts. In some embodiments, the conveyor belts may be modular conveyor belts. Modular belts may be formed of intermeshing modules, disposed in laterally extending rows, that are rotatably joined longitudinally. In some cases, a row of a modular belt may include multiple modules disposed laterally, and joined, for example, by a connecting rod. Modular belt modules may include laterally-aligned rod holes or slots at the forward and rearward portions of each row.

The term "link," as used in the present disclosure and claims, refers to a basic component of a conveyor belt row. For example, one individual link may be repeated laterally in order to form an entire row of links. In some embodiments, only two links per row are provided (at each end of the rod). In some embodiments, the links are capable of rotating independently from one another. In some embodiments, two or more links may be rigidly attached to one another.

The term "rod" or "connecting rod" refers herein to an elongated member used to associate links together. When associated, the links and rod form a basic modular conveyor belt.

The term "pitch" refers herein to one row of links extending from one lateral end of the conveyor belt to the opposite lateral end. In some embodiments, the pitch may be formed of one piece so that all the links in the same row are rigidly attached to one another. In other embodiments, the pitch may have multiple individual links arranged side-to-side, allowing each individual link to rotate with respect to one another. In other embodiments, the pitch may include a minimal number of links, such as only end links connected by connecting rods. In some embodiments, the pitch may include not only end links, but also one or more spaced-apart intermediate links positioned between the end links along the connecting rod.

The term "end link" refers herein to the most laterally disposed link in the pitch, or the terminating link for the pitch in a row. In some embodiments each pitch may have two end links, one end link for each side of the conveyor belt.

The term "retention cage" refers herein to a structure that is associated with the end link such that the retention cage is located on the side of the end link that is outward from the centerline of the conveyor belt. In other words, the retention cage forms the edge of the conveyor belt. In some embodiments, the retention cage secures the connecting rod so that the rod is not inadvertently removed from the conveyor belt during operation, assembly, or any other time.

Figure 3:
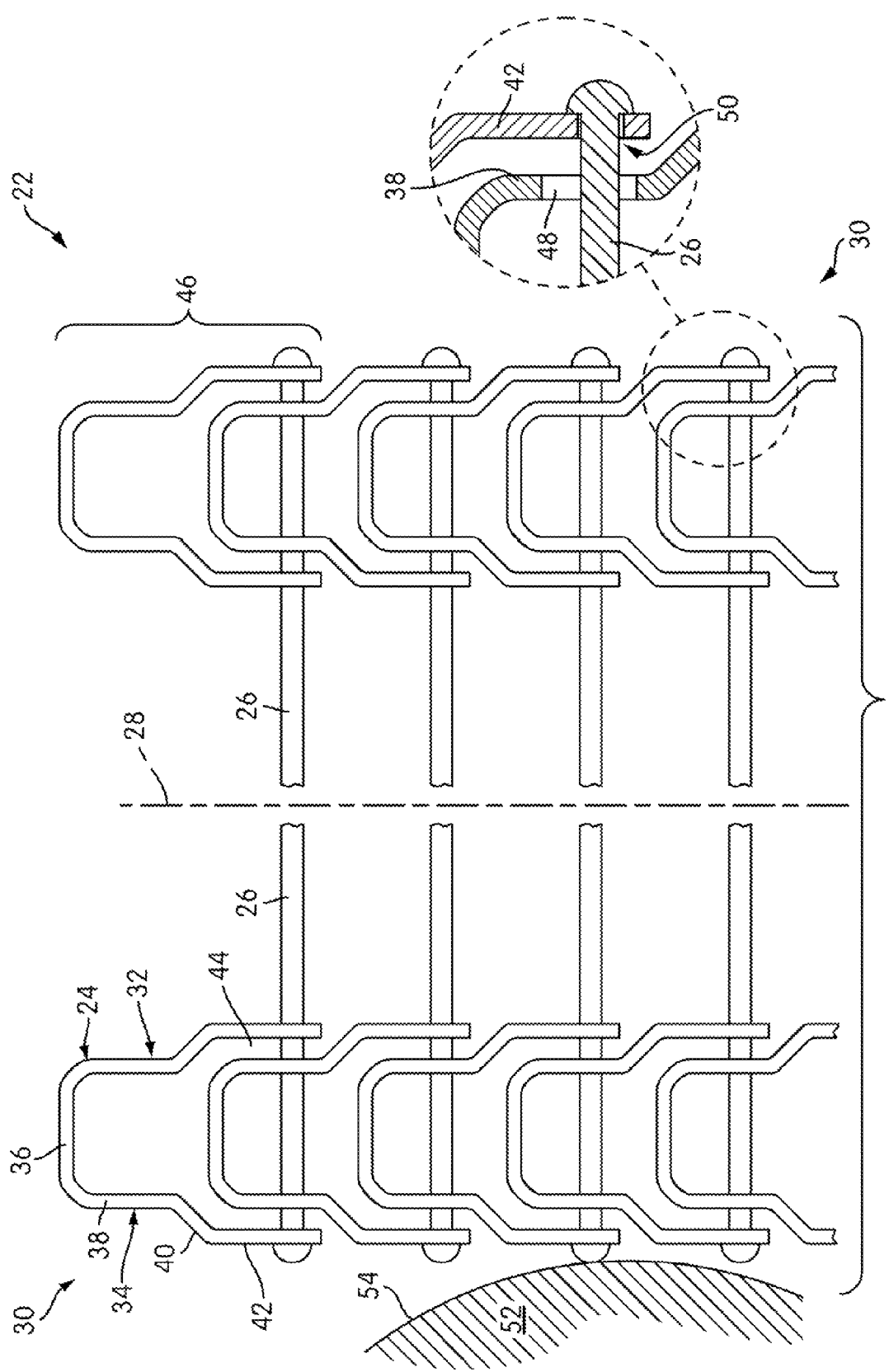
FIG. 3 is an illustration of an exemplary turn-curve conveyor belt.

FIG. 3 shows a top view of an exemplary modular conveyor belt 22. As illustrated in FIG. 3, conveyor belt 22 may include a plurality of links 24 connected by a plurality of elongated rods 26. A center line 28 indicates the approximate midline of conveyor belt 22. Conveyor belt 22 may include outer ends 30. For purposes of this disclosure, the term "outer," as used in this description and the appended claims, shall refer to a direction toward outer ends 30 of conveyor belt 22 and away from center line 28. Conversely, the term "inner" shall refer to a direction toward center line 28 and away from outer ends 30 of conveyor belt 22. In addition, for purposes of this disclosure, the term "longitudinal direction" shall refer to the direction in which center line 28 is oriented.

As shown in FIG. 3, all of rods 26 may be substantially similar in shape and dimension, with each of rods 26 being an elongated cylindrical body formed of an elongated portion of a rod material. In some embodiments, rods 26 may be made from a metal material, such as steel, stainless steel, aluminum, titanium, and/or other metals. In other embodiments, rods 26 may be made from a non-metallic material, such as plastic, wood, carbon fiber, and/or other non-metallic materials. In some embodiments, rod 26 may be a substantially hollow tube or pipe. In other embodiments, rod 26 may be solid.

The inner portions of rods 26 (near center line 28) are truncated in FIG. 3 for purposes of illustration. Rods 26 may be any suitable length for supporting and carrying a variety of wares. In some embodiments, rods 26 may have a uniform or substantially uniform diameter along the length of the cylindrical body. The diameter may be selected based upon factors such as the type of goods being moved on conveyor belt 22, the width of conveyor belt 22, and/or other considerations. In some embodiments, rods 26 may include tapering or stepped configurations.

As shown in FIG. 3, rods 26 may be operatively connected to each other with links 24. In some embodiments, links 24 may be substantially U-shaped, wherein each link 24 is constructed with two legs, including an inner leg 32 and an outer leg 34, joined by a connecting member 36. In some embodiments, inner leg 32 and outer leg 34 may be mirror-image forms. Accordingly, as the configuration of inner leg 32 and outer leg 34 are identical save for opposing orientation, for the sake of clarity, only the structure of outer leg 34 is discussed with particularity. Outer leg 34 may include a relatively straight upper portion 38 connected by an outwardly-tapering transition region 40 to a relatively straight lower portion 42. This configuration creates a wider lower opening 44 to allow for the interconnection of links 24, as connecting member 36 of one link may readily slide into a nesting relationship with lower portion 42 of an adjacent link. In some embodiments, the fitment of one link within another may be a relatively loose fitment, allowing several millimeters of lateral movement between the components. In other embodiments, the fitment may be substantially tighter, leaving only minimal space between the components, and thus, maintaining the links in a consistent alignment when nested.

It will be appreciated that the form of the links joining together elongate rods is not limited to the configurations shown and discussed in the present disclosure. In some embodiments, the configuration of the connective links may be simpler than link 24. For example, in some embodiments, each leg of the link may include a single straight portion. Alternatively, the configuration of the connective link may be more involved for certain applications. For example, embodiments are envisioned wherein the connective links have more bends and/or a more complex shape than link 24. In addition, although inner leg 32 and outer leg 34 are shown in the accompanying drawings as having mirror images of each other to provide symmetry for link 24, in other embodiments, link 24 may be asymmetrical.

Each rod 26 may be fixedly attached to two links 24 (for example by welding), one at each end of the rod, forming a pitch 46. Pitches 46 may be rotatably connected to one another. For example, each rod 26 may pass through openings 48 in upper portions 38 of outer legs 34 and through corresponding openings in inner legs 32. While rods 26 may be fixedly attached to outer leg 34 at or near opening 50 in lower portion 42, rods 26 may be free to rotate within the openings 48 in upper portions 38 and the counterpart openings in inner legs 32.

In some cases, conveyor belts may be configured for a straight path of conveyance. Such belts are often referred to as "straight run" conveyor belts. In other cases, conveyor belts may be configured for turning laterally to the left and/or right. Such belts are often referred to as "turn curve" conveyor belts. In order to navigate curves, modular conveyor belts may be collapsible longitudinally. In some cases, the entire width of the belt may be collapsible longitudinally. In other cases, only one end of the belt may be collapsible, for example, when the belt is only needed to turn in one direction. Belts may be made collapsible by utilizing longitudinally oriented slots instead of circular holes to receive the rods. The structure that enables collapsibility of conveyor belts is discussed in greater detail below.

Conveyor belt 22, as shown in FIG. 3, may be a collapsible type of conveyor belt. That is, the belt pitches may be movable longitudinally with respect to one another. In order to facilitate this longitudinal collapsibility, the openings 48 in upper portions 38 of outer legs 34 and counterpart openings in inner legs 32 may be longitudinally slotted, as shown in FIG. 3, thus allowing for longitudinal translation of a rod of a given pitch 46 within a link of an adjoining pitch.

Conveyor belt 22 may be collapsible at both outer ends 30 or at only one of outer ends 30. Further, in some embodiments, outer ends 30 may be independently collapsible, that is, each end 30 may be collapsible independent of the opposite outer end 30 of conveyor belt 22. This independent collapsibility may enable conveyor belt 22 to be propelled around turns. That is, when being propelled around a turn, the outer end 30 of conveyor belt 22 that is on the inside of the turn may collapse longitudinally, whereas the outer end 30 on the outside of the turn may remain expanded longitudinally. Such a conveyor belt may be referred to as a "turn-curve" conveyor belt.

Conveyor belt 22 may be driven, pulled, propelled, and/or guided by a structure such as a drum 52. Drum 52 may have a drive surface 54, which may contact outer end 30 of conveyor belt 22. In some embodiments, drum 52 may be configured to simply guide conveyor belt 22 along a designated path. That is, a separate drive mechanism may propel conveyor belt 22, and drum 52 may guide conveyor belt 22 along the designated path. In other embodiments, drum 52, in addition to guiding conveyor belt 22, may also be configured to propel conveyor belt 22. Thus, conveyor belt 22 may be configured to contact drive surface 54.

The drive surface of the drum or other such propulsion or guidance device may be configured to engage a conveyor belt. The drive surface may be made of any suitable material for such contact. For example, the drive surface of the drum may be made of rubber, plastic, metal, and other suitable materials. These materials can be hard, abrasive, and/or may carry debris that acts as an abrasive during contact of the drive surface with the contact weld on an outer portion of the conveyor belt.

In some cases, conveyor belts may be flat top belts. Flat top belts are manufactured with a support surface on one face of the links so that the surface abuts an adjacent link, therefore leaving no significant open areas between rows, or pitches.

In some embodiments, the belts may be picket style belts. Picket style belts have transverse links resembling the shape of a square wave mathematical function. The links in picket style belts have laterally aligned rod holes or slots allowing for a connecting rod to be inserted.

In some cases, the pickets or "pitches" of picket style belts may have the formed of an oscillating flat member. Such picket style belts are referred to as "flat wire" style belts. Examples of basic flat wire style conveyor belt structures and manufacturing methods can be found in U.S. Pat. Nos. 4,846,339 and 5,954,188, which are incorporated herein by reference. These structures and methods of manufacturing are generally applicable to the conveyor belt embodiments described herein.

Figure 4:
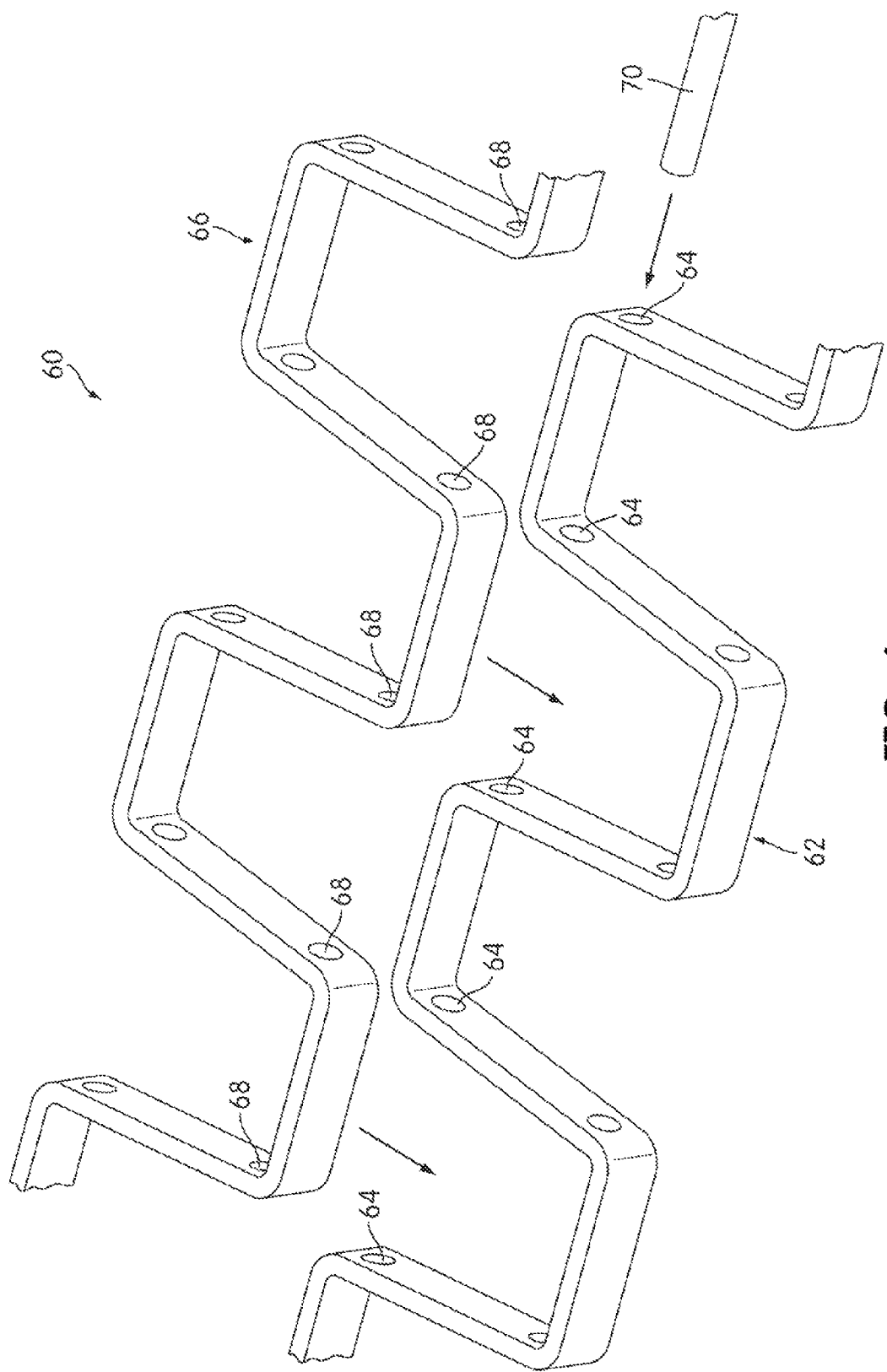
FIG. 4 is a perspective view of an exemplary prior art flat wire conveyor belt.

FIG. 4 is a schematic view of two pitches of a prior art flat wire style conveyor belt 60. As can be seen in FIG. 4, flat wire belt 60 may include a first pitch 62, which may have multiple rod receiving apertures 64. Belt 60 may also include a second pitch 66. Second pitch 66 may also include multiple rod receiving apertures 68. When rod receiving apertures 64 are aligned with rod receiving apertures 68, a substantially straight rod receiving path, configured to receive a connecting rod 70, is formed extending transversely across second pitch 66.

In order to assemble a conveyor belt using first pitch 62 and second pitch 66, first pitch 62 may be positioned adjacent to a second pitch 66. First pitch 62 is then engaged with or interconnected with second pitch 66 so that first pitch rod receiving apertures 64 align with second pitch rod receiving apertures 68 to form a rod receiving path. The rod receiving path enables connecting rod 70 to be pushed through both first pitch rod receiving apertures 64 and second pitch rod receiving apertures 68 to associate first pitch 62 and second pitch 66.

Another type of modular conveyor belt is a finger style belt. Finger style belts may include links that feature a straight or zig-zag central transverse rib from which finger-like protrusions extend in the forward and/or rearward direction. The fingers typically have laterally aligned rod holes or slots allowing for a connection rod to be inserted.

Figure 5:
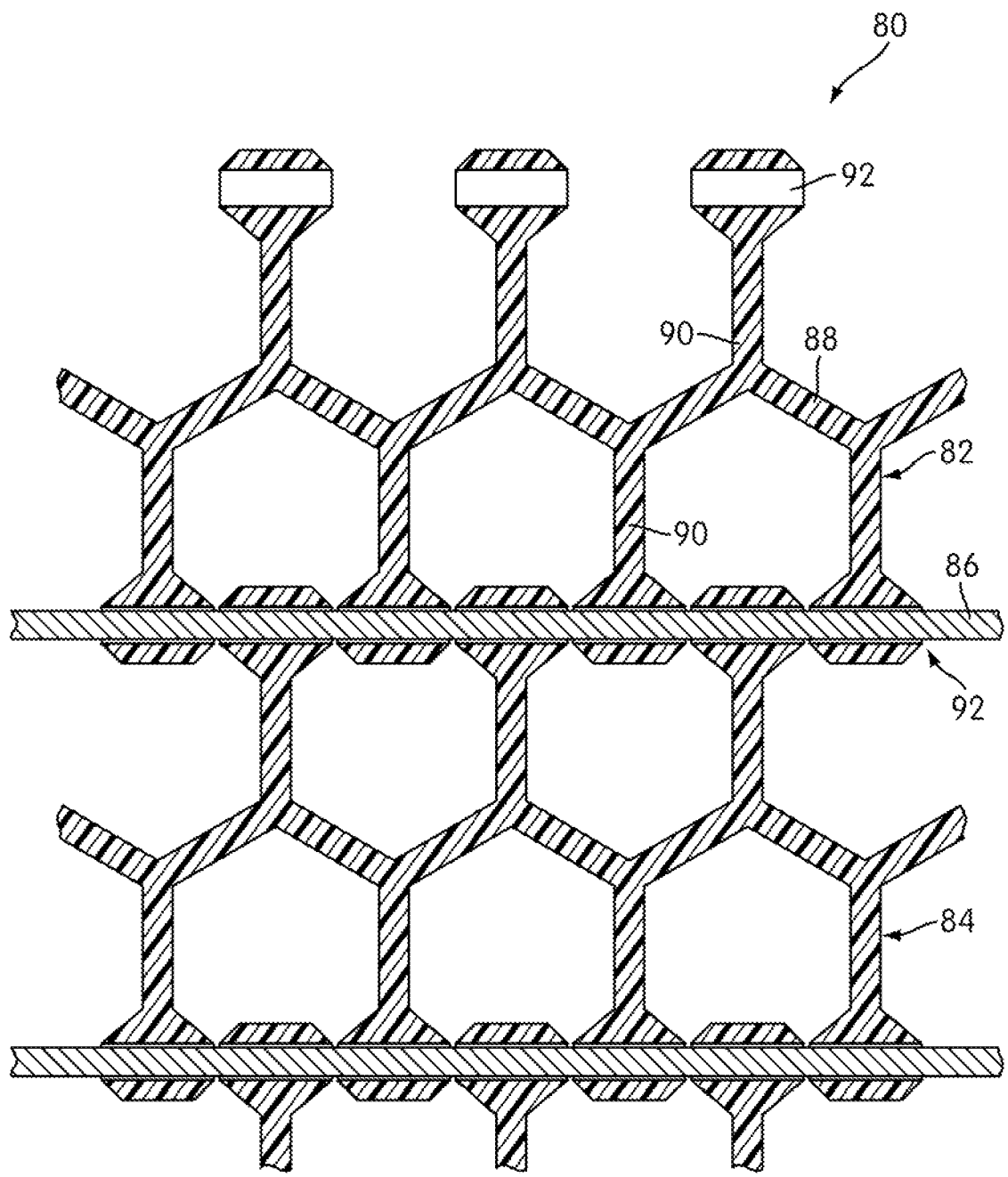
FIG. 5 is a cross-sectional view of an exemplary finger style conveyor belt.

FIG. 5 illustrates an exemplary finger style belt 80. As shown in FIG. 5, belt 80 may include a first pitch 82 hingedly connected to a second pitch 84 via a connecting rod 86. Each pitch of belt 80 may include a zig-zag transverse rib 88. In addition, each pitch may include alternating finger-like protrusions 90, which may include rod receiving apertures 92 configured to receive connecting rod 86. In order to assemble belt 80, apertures 92 on one pitch may be aligned with apertures 92 on an adjacent pitch to form a rod receiving path, through which connecting rod may be inserted to connect the pitches to one another.

In some cases, the pitches, especially those made of plastics, may have a certain amount of flexibility, which can complicate the alignment process. Therefore, the alignment process can take a significant amount of time. In addition, in some cases, the components of the conveyor belt may not lend themselves well to automated assembly. Accordingly, assembly, including the alignment process described above, may be performed by a skilled belt assembler, who may be more expensive to employ than a comparable employee without such a specialized skill. Thus, assembling traditional conveyor belts without alignment features may require a significant amount of time and considerable cost.

The following discussion describes embodiments including alignment features configured to facilitate the connecting rod insertion process. The embodiments disclosed herein may be applicable to any suitable type of conveyor belt, such as those mentioned above.

Figure 6:
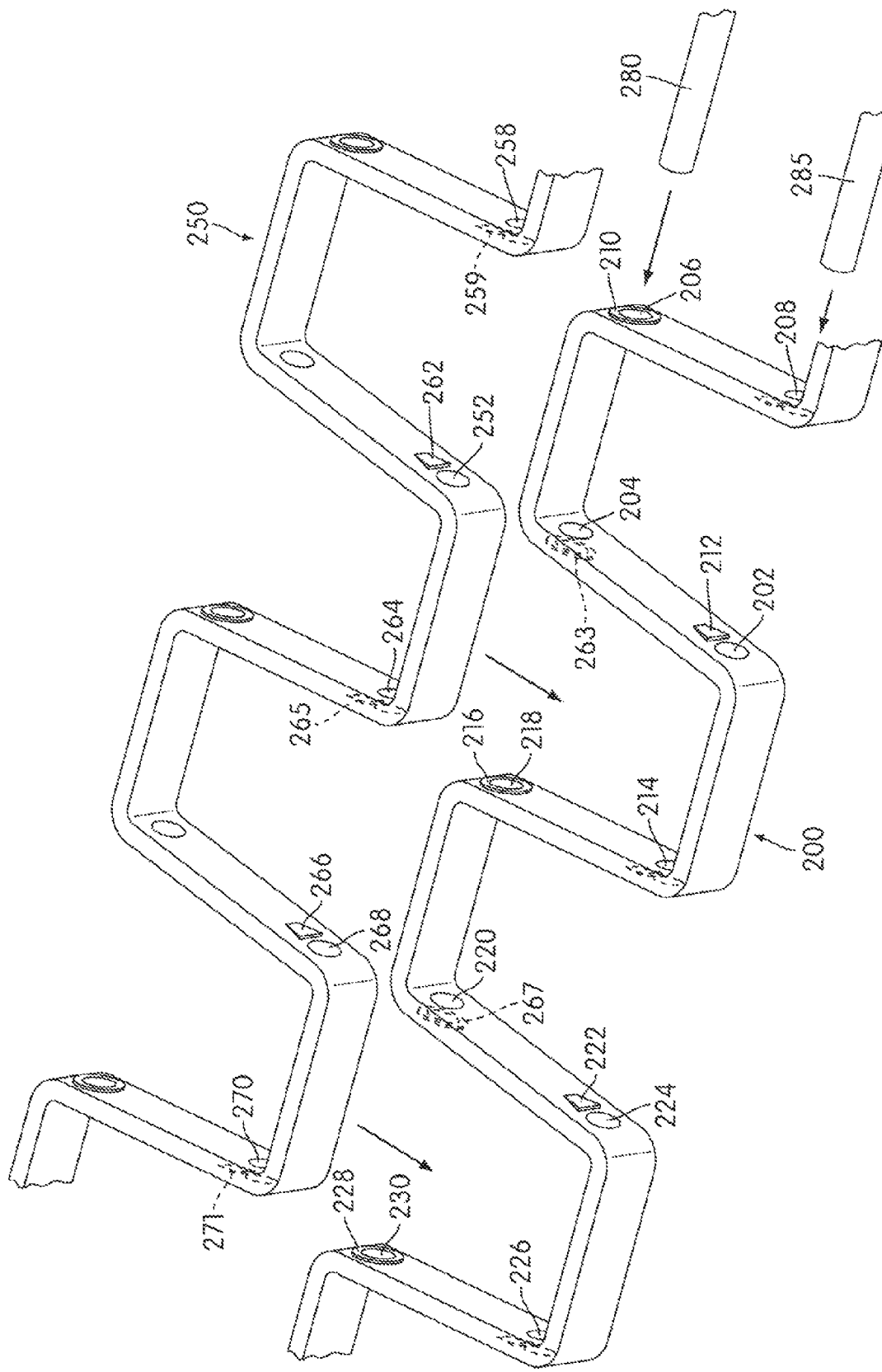
FIG. 6 is a perspective, exploded view of two pitches of a conveyor belt embodiment including links with alignment features proximate rod receiving apertures.

FIG. 6 shows an embodiment of two pitches of a modular, flat wire style conveyor belt with alignment features on the legs of the links proximate the rod receiving apertures. These alignment features are intended to simplify the alignment process to reduce assembly time and cost.

As can be seen in FIG. 6, a first pitch 200 may have a first first pitch rod receiving aperture 208, a second first pitch rod receiving aperture 202, a third first pitch rod receiving aperture 214, a fourth first pitch rod receiving aperture 224, and a fifth first pitch rod receiving aperture 226 forming a substantially straight first line extending transversely across first pitch 200 to create a first insertion path for a first connecting rod 285. Additionally, first pitch 200 may have a sixth first pitch rod receiving aperture 206, a seventh first pitch rod receiving aperture 204, an eighth first pitch rod receiving aperture 218, a ninth first pitch rod receiving aperture 220, and a tenth first pitch rod receiving aperture 230, forming a substantially straight second line extending transversely across second first pitch 200 to create a second insertion path for a second connecting rod 280.

The second insertion path may also include rod receiving apertures in a second pitch 250, including a first second pitch rod receiving aperture 258, a second second pitch rod receiving aperture 252, a third second pitch rod receiving aperture 264, a fourth second pitch rod receiving aperture 268, and a fifth second pitch rod receiving aperture 270. First second pitch rod receiving aperture 258 aligns with sixth first pitch rod receiving aperture 206, second second pitch rod receiving aperture 252 aligns with seventh first pitch rod receiving aperture 204, third second pitch rod receiving aperture 264 aligns with eighth first pitch rod receiving aperture 218, fourth second pitch rod receiving aperture 268 aligns with ninth first pitch rod receiving aperture 220, and fifth second pitch rod receiving aperture 270 aligns with tenth first pitch rod receiving aperture 230 to form the second insertion path for the second connecting rod 280. Arrows in FIG. 6 show the direction that second pitch 250 may be moved in order to bring second pitch 250 into proper alignment with first pitch 200 in order to form a complete second insertion path for the second connecting rod 280.

In order to aid in the alignment process, the pitches may be provided with protrusions disposed proximate to the rod receiving apertures. In some embodiments, the protrusions may surround or partially surround one or more of the rod receiving apertures. Each protrusion may extend outwardly a predetermined distance from the surface of the pitch, so that the protrusion has an outer side surface spaced from the surface of the pitch.

In addition, the protrusions may have at least one mating surface that may be configured to abut a corresponding mating surface on a portion of another pitch. The mating surface may have any suitable shape. For example, in some embodiments, the protrusions may have a circular/cylindrical shape. For example, in some embodiments, the protrusion may be a substantially cylindrical flange extending about the rod receiving aperture. Such circular/cylindrical protrusions may have curved or rounded mating surfaces. Curved or rounded mating surfaces may enable the pitches to rotate with respect to one another. In addition, cylindrical flanges may form and function as part of the rod receiving apertures.

In other embodiments, the protrusion may have another shape (other than circular/cylindrical), such as oval, semicircular, linear, polygonal, or other suitable shapes, depending on factors such as the desired relative motion of the assembled pitches. In some embodiments, the mating surface may be substantially planar. In addition, in some embodiments, the mating surface of the protrusion may be substantially perpendicular to the surface of the pitch from which it extends. In other embodiments, the mating surface of the protrusion may be sloped relative to the surface of pitch.

As can be seen in FIG. 6, conveyor belt alignment features may include a first cylindrical protrusion 210, which may surround sixth first pitch rod receiving aperture 206. In addition, a second cylindrical protrusion 216 may surround eighth first pitch rod receiving aperture 218, and a third cylindrical protrusion 228 may surround tenth first pitch rod receiving aperture 230. A cylindrical protrusion 263 similar to first cylindrical protrusion 210 may also surround seventh first pitch rod receiving aperture 204. In addition, a cylindrical protrusion 267 may be disposed proximate ninth first pitch rod receiving aperture 220. Protrusions 263 and 267 are shown in phantom since these elements are disposed on a hidden surface of pitch 200.

As shown in FIG. 6, additional alignment features may include a first protrusion 262 proximate second second pitch rod receiving aperture 252, as well as a second protrusion 266 proximate fourth second pitch rod receiving aperture 268. In some embodiments, second protrusion 266 may be disposed proximate second pitch rod receiving aperture 268 substantially in vertical alignment with second pitch rod receiving aperture 268. In other embodiments, the protrusion may be disposed proximate the rod receiving aperture in an alternative alignment. For example, as discussed in greater detail below, in some embodiments, the protrusion may be disposed proximate the rod receiving aperture substantially in longitudinal alignment with the rod receiving aperture.

In some embodiments, the protrusion may be substantially wedge-shaped. For example, first protrusion 262 may be sloped in height, so that the portion of first protrusion 262 located furthest away from second second pitch rod receiving aperture 252 may be substantially even, or flush, with the surface of second pitch 250, and the portion of first protrusion 262 closest to second second pitch rod receiving aperture 252 may extend a first distance from the surface of second pitch 250. The portion of first protrusion 262 closest to second second pitch rod receiving aperture 252 may extend outwardly from the surface of second pitch 250 in order to form a mating surface that may be configured to abut the mating surface of a cylindrical protrusion 263 disposed proximate aperture 204 in pitch 200.

Similarly to the protrusion discussed above, second protrusion 266 may be sloped in height, so that the portion of second protrusion 262 located furthest away from fourth second pitch rod receiving aperture 268 may be substantially even, or flush, with the surface of second pitch 250, and the portion of second protrusion 266 closest to fourth second pitch rod receiving aperture 268 may extend a first distance from the surface of the second pitch 250. The portion of second protrusion 266 closest to fourth second pitch rod receiving aperture 268 may extend outwardly from the surface of second pitch 250 in order to form a mating surface that may be substantially perpendicular to the surface of the second pitch 250. A wedge-shaped protrusion 259 similar to 262 may also be disposed proximate first second pitch rod receiving aperture 258. As shown in FIG. 6, protrusion 259 may be configured to abut protrusion 210 on first pitch 200. Additional wedge-shaped protrusions 265 and 271 may be disposed proximate apertures 264 and 270 respectively.

Alignment features, such as wedge-shaped protrusions may be formed by any suitable method. In some embodiments, the features may be molded (plastic) or stamped (metal) into the form of a pitch. In some embodiments, the features may be formed by deforming/displacing material on the surface of the pitch.

Figure 7:
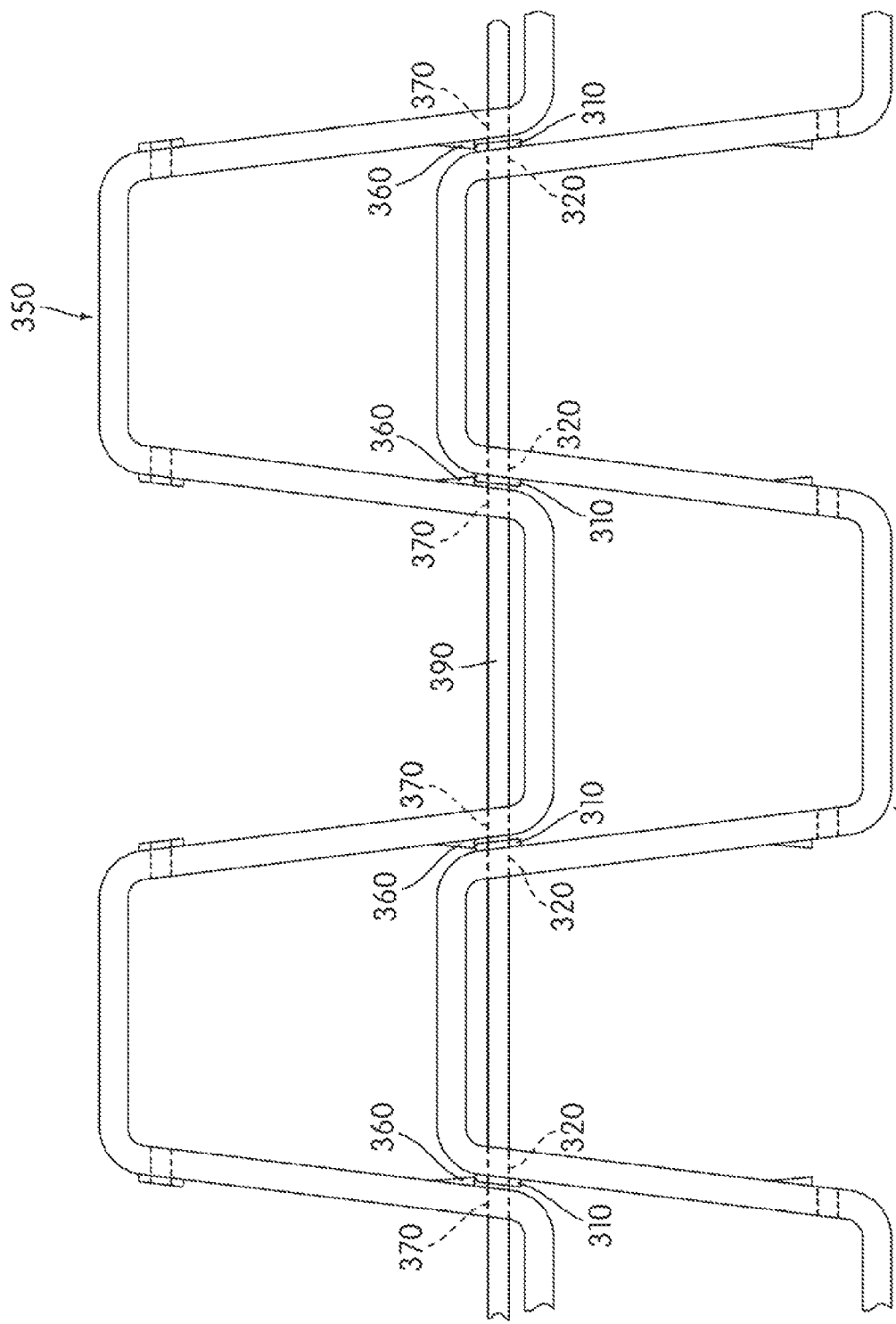
FIG. 7 is a partial plan view of an assembled conveyor belt embodiment including links having alignment features, where the alignment features have been used to properly position the rod receiving apertures to form a rod receiving pathway.

FIG. 7 is a plan view of an embodiment of a conveyor belt with alignment features associated with the legs of the links. In FIG. 7, a third pitch 300 may have third pitch rod receiving apertures 320 that extend transversely through third pitch 300. Similarly, a fourth pitch 350 may have fourth pitch rod receiving apertures 370 that extend transversely through fourth pitch 350. Third pitch rod receiving apertures 320 are configured to be aligned with fourth pitch rod receiving apertures 370 to assemble the pitches into a portion of a conveyor belt by inserting a connecting rod through the aligned rod receiving apertures, which form a rod receiving path through the pitches.

Alignment features on third pitch 300 may include cylindrical protrusions 310 that may extend outwardly some distance from the surface of the third pitch 300, so that the cylindrical protrusions 310 may have an outer side surface that may be substantially perpendicular to the surface of the pitch 300. The cylindrical protrusions 310 shown in FIG. 7 surround third pitch rod receiving apertures 320 that extend transversely through the third pitch 300.

Alignment features on the fourth pitch 350 may include wedge-shaped protrusions 360 near rod receiving apertures 370. The wedge-shaped protrusions 360 may be sloped in height, so that the portion of the protrusions 360 furthest from the rod receiving apertures 370 may be substantially even with the surface of the fourth pitch 350 and the portion of the protrusions 360 closest to the rod receiving apertures 370 may extend a first distance from the surface of the fourth pitch 350. The portion of the protrusions 360 closest to fourth pitch rod receiving apertures 370 may extend outwardly from the surface of fourth pitch 350 in order to form a side surface that may be substantially perpendicular to the surface of fourth pitch 350.

In order to align third pitch rod receiving apertures 320 with fourth pitch rod receiving apertures 370, mating surfaces of wedge-shaped protrusions 360 located on fourth pitch 350 may be engaged with mating surfaces of cylindrical protrusion 310 located on third pitch 300. The engagement of wedge-shaped protrusions 360 and cylindrical protrusions 310 may be achieved by abutting wedge-shaped protrusions 360 against the side walls of cylindrical protrusions 310. The wedge-shaped protrusions 360 and the cylindrical protrusions 310 may be formed so that when the mating surfaces are brought into contact with, or close proximity to, one another, third pitch rod receiving apertures 320 are properly aligned with fourth pitch rod receiving apertures 370 so that a connecting rod may be easily pushed through all of the third pitch rod receiving apertures 320 and fourth pitch rod receiving apertures 370 without being impeded and/or encountering obstructions in the rod receiving path.

Once the rod receiving apertures 320 in the third pitch 300 are properly aligned with the rod receiving apertures 370 in the fourth pitch 350, the connecting rod 390 may be inserted into rod receiving apertures 320 and 350 in order to fixedly attach the third pitch 300 to the fourth pitch 350. Although the third pitch 300 may be fixedly attached to the fourth pitch 350 in FIG. 7, the third pitch 300 and the fourth pitch 350 may still rotate independent of one another about the longitudinal axis of the connecting rod 390.

Figure 8:
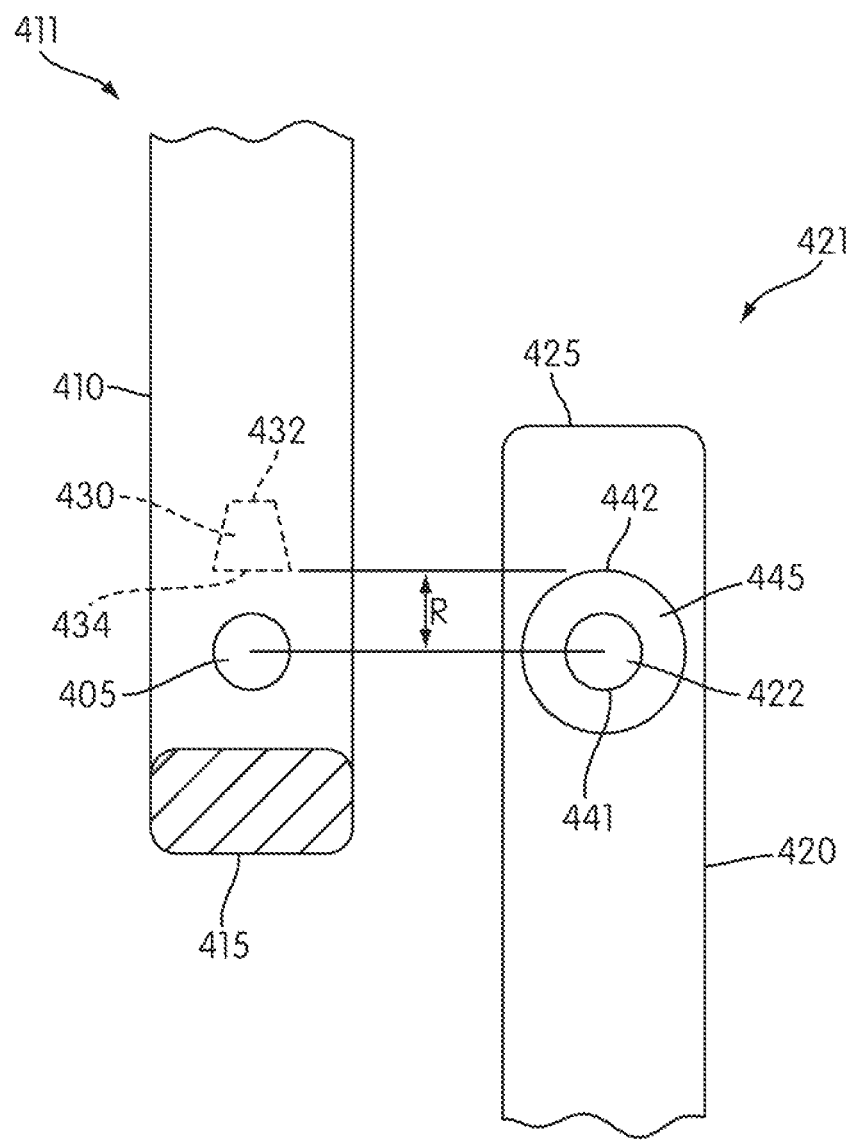
FIG. 8 is an enlarged, partial cross-sectional view of a portion of a conveyor belt embodiment including links with alignment features on the link legs proximate rod receiving apertures.

FIG. 8 is an enlarged plan view of a portion of an embodiment of two links of a conveyor belt with alignment features. In FIG. 8, a first link 410 from a first pitch 411 may be attached to a second link 420 from a second adjacent pitch 421. The first link 410 may have a rod receiving aperture 405 on one end 415. The second link 420 from second pitch 421 may have a rod receiving aperture 422 on one end 425. A wedge-shaped protrusion 430 may be disposed on a surface 446 of first link 410. In addition, second link 420 may include a cylindrical protrusion 445 disposed proximate rod receiving aperture 422.

Figure 9:
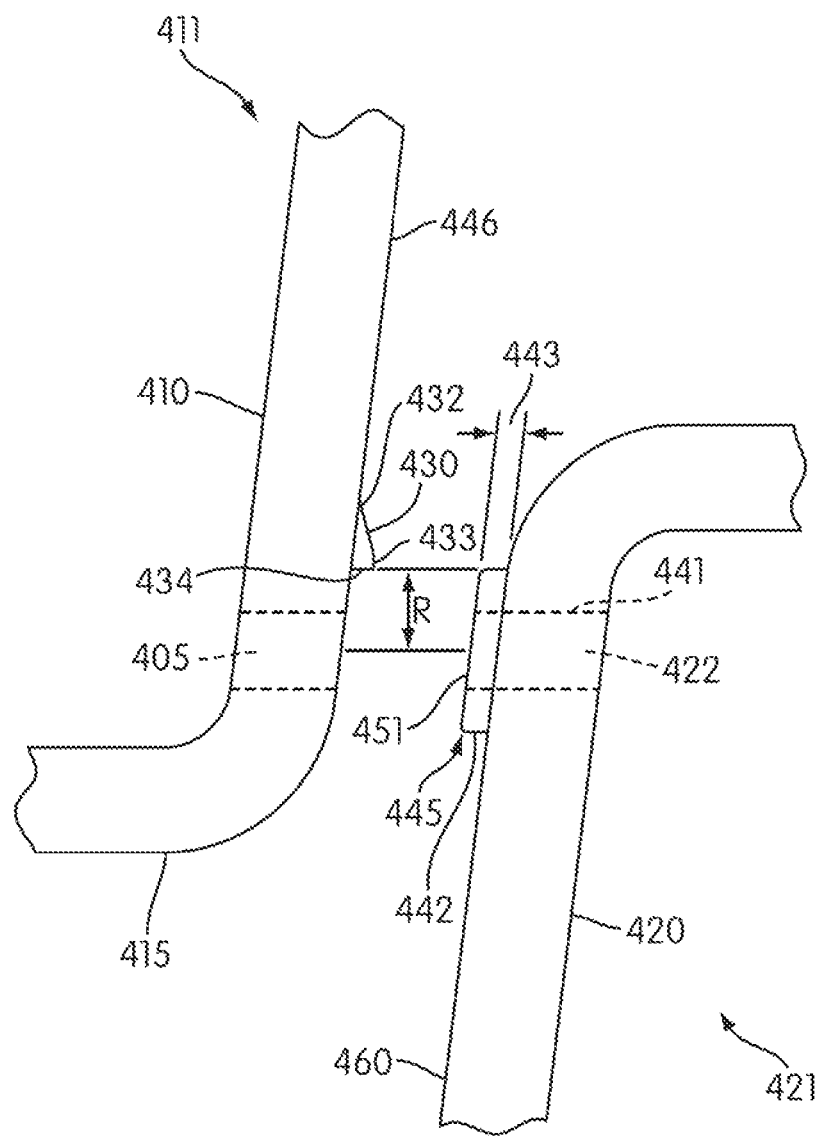
FIG. 9 is an enlarged, partial plan view of the link legs shown in FIG. 8.

FIG. 9 is an enlarged side view of the link legs shown in FIG. 8 relating to an embodiment of links of a conveyor belt with alignment features. As shown in FIG. 9, a proximal edge forming a mating surface 434 of wedge-shaped protrusion 430 may be located a distance R from the center of the rod receiving aperture 405. Wedge-shaped protrusion 430 may be sloped in height so that distal edge 432, furthest away from the rod receiving aperture 405, may be substantially the same height as surface 446 of first link 410. Mating surface 434, which is closest to rod receiving aperture 405, may extend a first distance from surface 446 of first link 410. In some embodiments, the mating surface formed by mating surface 434 may be substantially perpendicular to surface 446 of first link 410. In some embodiments, mating surface 434 may extend approximately 0.5 mm from the surface of the first link 410. In other embodiments, the mating surface 434 may extend more or less than 0.5 mm from the surface of the first link 410. As shown in FIG. 9, mating surface 434 may be disposed facing in the direction of rod receiving aperture 405.

In some embodiments, mating surface 434 may be substantially planar, as shown in FIGS. 6-15. In other embodiments, as will be discussed in greater detail below, the mating surface may be curved. For example, the mating surface may be curved to mate with the mating surface of a mating protrusion (e.g., protrusion 440).

As shown in FIG. 9, cylindrical protrusion 445 may extend outwardly a predetermined distance from a surface 460 of second link 420, so that cylindrical protrusion 445 has mating surface 442 and an inner side surface 441, both of which may be substantially perpendicular to surface 460 of second link 420. In some embodiments, outer side surface 442 of cylindrical protrusion 445 may extend 0.5 mm from the surface of first link 410. In other words, the height of mating surface 442 may be approximately equal to 0.5 mm. In other embodiments, mating surface 442 of cylindrical protrusion 445 may extend more or less than 0.5 mm from surface 460 of second link 420. Mating surface 442 of cylindrical protrusion 420 may have a radius R so that mating surface 442 of cylindrical protrusion 445 may abut the mating surface formed by proximal edge 434 of wedge-shaped protrusion 430 on first link 410.

Although protrusion 430 on first link 410 is shown as wedge-shaped in FIG. 8, protrusion 430 may have any suitable form including a mating surface facing rod receiving aperture 405. For example, in some embodiments, protrusion 430 may form a bump, or other type of projection, extending from surface 446 of first link 410. In some embodiments, the bump or projection may extend approximately 0.5 mm from surface 446 of first link 410. In other embodiments, the bump or projection may extend more or less than 0.5 mm from surface 446 of first link 410. In some embodiments, the bump or projection may be formed by soldering or welding material onto surface 446 of first link 410. In some embodiments, the bump or projection may extend outwardly from surface 446 of first link 410 in order to form a mating surface configured to abut mating surface 442 of cylindrical protrusion 445 on second link 420.

As shown in FIG. 9, wedge-shaped protrusion 430 may include a protruding edge 433 located a distance R from the center of rod receiving aperture 405. Protruding edge 433 may be approximately 0.5 mm from surface 446 of first link 410. As also shown in FIG. 9, in some embodiments, the height of the wedge-shaped protrusion 430 may be substantially equal to height 443 of the cylindrical protrusion 445.

Various types of materials may be used to manufacture the disclosed conveyor belt links. In some embodiments, the pitches and/or links may be manufactured from plastic materials. For example, the pitches and/or links could be made from polypropylene, polyethylene, polyoxymethylene, or polyvinylidene fluoride. In some embodiments, the pitches and/or links may be formed by injection molding. In some embodiments, the pitches and/or links may be manufactured from metal, such as steel or stainless steel. In some embodiments, the pitches and/or links may be made from more than one layer of material. In some embodiments, the pitches and/or links may be coated with a different material than the material making up the remaining components of the conveyor belt. Also, in some embodiments, the connecting rods may be made of the same material as the pitches and/or links. In other embodiments, the connecting rods may be made of a different material than the pitches and/or links. For example, in some embodiments, the pitches, including the links, may be formed of plastic, and the rods may be formed of metal.

The concepts of the present disclosure, including the discussed alignment features, may be applicable to conveyor belts assembled with connecting rods formed of any material. As discussed above, the flexibility of the rods may influence how difficult it is to insert the rods, and the flexibility of the rods may be determined by the diameter of the rods, the length of the rods, and the material used to form the rods. In some cases, plastic rods may be used, whereas, in other cases, metal rods may be used. Typically, plastic rods have a larger diameter than metal rods used for similar conveyor belts, in order to provide the rods with suitable stiffness and strength. The smaller diameter of metal rods and the corresponding rod receiving apertures may make alignment of the apertures and insertion of the rods more difficult. Accordingly, the presently disclosed alignment features may be more beneficial to embodiments implementing metal connecting rods. Further, the disclosed alignment features may be more beneficial to smaller diameter connecting rods in general.

Figure 10:
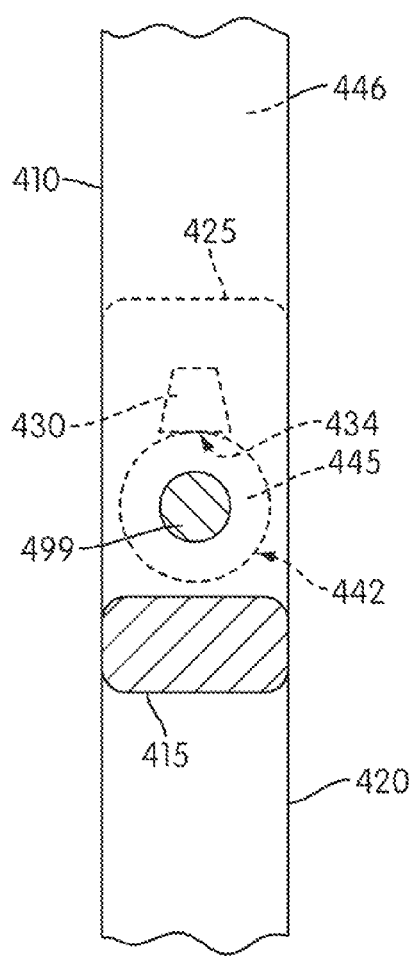
FIG. 10 is an enlarged partial side view of another embodiment of two adjacent and interconnected links with alignment features proximate the rod receiving apertures, with the rod receiving apertures properly aligned.

FIG. 10 is a view of another embodiment of a conveyor belt with alignment features on the links with the conveyor belt links properly aligned. FIG. 10 shows first link 410 and second link 420 from FIGS. 7 and 8. As shown in FIG. 10, mating surface 434 of wedge-shaped protrusion 430 on first link 410 may abut mating surface 442 of cylindrical protrusion 445 on second link 420. Abutting the mating surfaces in such a manner may result in the rod receiving aperture in first link 410 aligning with the rod receiving aperture of second link 420. A connecting rod 499 may be inserted in the rod receiving apertures in order to fixedly attach first link 410 to second link 420.

Figure 11:
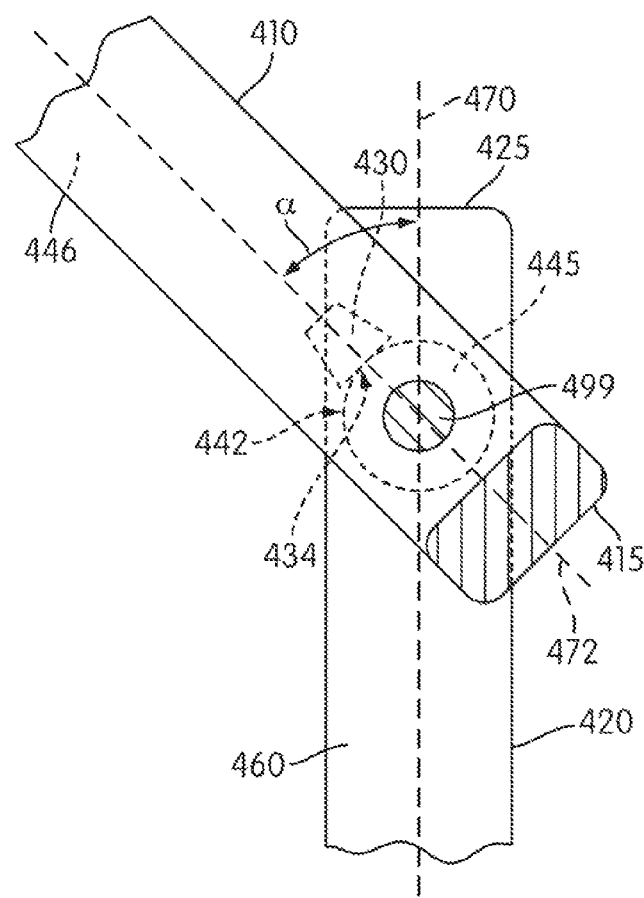
FIG. 11 is an enlarged partial side view of the links shown in FIG. 10, where the links are angled with respect to each other and the rod receiving apertures remain properly aligned.

FIG. 11 is a schematic view of the conveyor belt embodiment shown in FIGS. 8-10 with the rod receiving apertures properly aligned while the pitches/links are disposed at an angle with respect to one another by virtue of being rotationally displaced about rod 499. The mating surface 434 of wedge-shaped protrusion 430 on first link 410 may be abutted with mating surface 442 of cylindrical protrusion 445 on second link 420 at any angle α. As shown in FIG. 11, an axis 472 of first link 410 may be disposed in substantial non-alignment with an axis 470 of second link 420. Even while disposed in substantial non-alignment, mating surface 434 of wedge shaped protrusion 430 may still be mated with mating surface 442 of cylindrical protrusion 445 in order to align rod receiving aperture in first link 410 with the rod receiving aperture in second link 420. In other words, in some embodiments, the protrusions may be configured to not act as stops for the relative rotation of the links of an assembled conveyor belt. In such embodiments, the protrusions may simply act as stops for the advancement of links towards each other during manufacturing, while allowing rotational movement of the links relative to one another.

Figure 12:
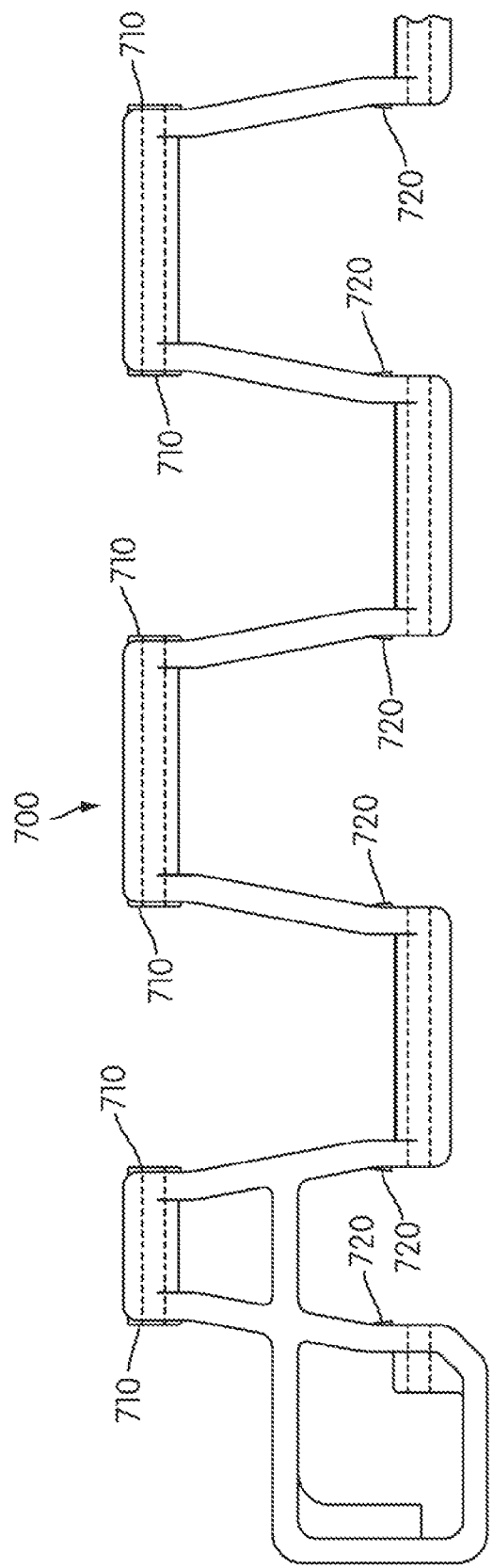
FIG. 12 is a plan view of several links of a pitch of another conveyor belt embodiment, where each link includes alignment features and an end link includes a retention cage.

FIG. 12 is a schematic view of a pitch 700 of a different picket style conveyor belt. Pitch 700, unlike pitch 250 shown in FIG. 4, is not flattened in all locations, and instead includes substantially cylindrical connecting portions through which the connecting rods may be inserted. However, like pitch 250, pitch 700 includes similar alignment features. The alignment features may include a combination of cylindrical protrusions 710 and wedge-shaped protrusions 720.

As shown in FIG. 12, pitch 700 may be formed of several links that are repeated laterally. In some embodiments, the end link may or may not have the same shape or design as the remaining links in the same row. In some embodiments, the end link may be associated with a retention cage adapted to retain a connecting rod without welding, forming button heads, adhering, or otherwise fastening the rod into position. Embodiments of such rod retaining features are more fully disclosed in U.S. Patent Publication No. 2013/0140146; U.S. Patent Publication No. 2013/0140149; U.S. Pat. No. 8,636,141; U.S. Pat. No. 8,607,967; and U.S. Patent Publication No. 2013/0140152, each of which is filed on even date herewith, is entitled "Conveyor Belt Link with Rod Retaining Feature," and is incorporated herein in its entirety by reference.

Figure 13:
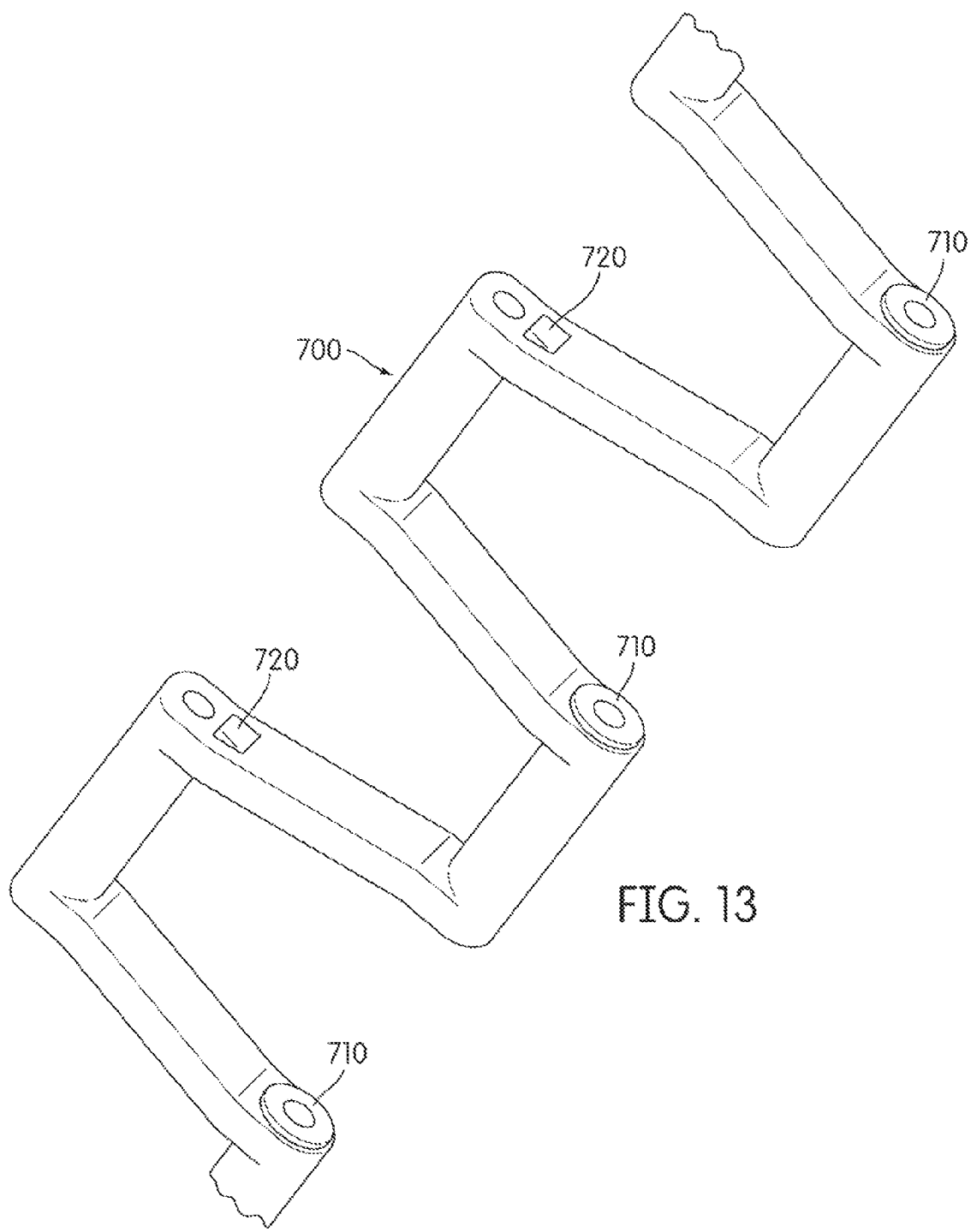
FIG. 13 is an enlarged partial-perspective view of links of the embodiment shown in FIG. 12.

FIG. 13 is a more detailed view of the pitch in FIG. 12. As can be seen in FIG. 13, pitch 700 may include a combination of cylindrical protrusions 710 and wedge-shaped protrusions 720.

Figure 14:
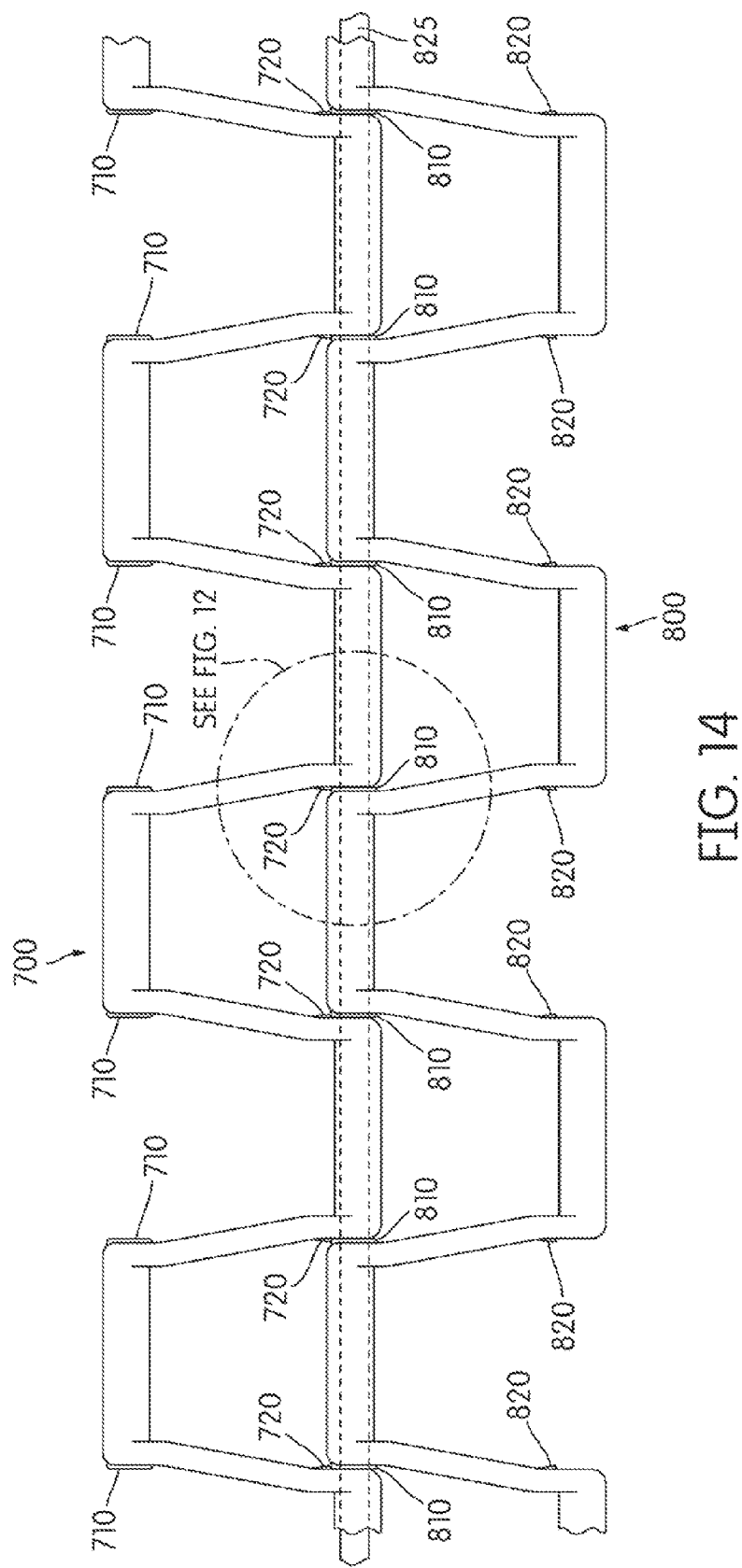
FIG. 14 is a plan view of two pitches of an assembled conveyor belt embodiment, including alignment features.

FIG. 14 is a schematic view of a portion of a conveyor belt embodiment formed from the joinder of pitches like that shown in FIG. 13. As shown in FIG. 14, the mating surface of cylindrical protrusions 810 on pitch 800 may be mated with the mating surface of wedge-shaped protrusions 720 on a pitch 700. A connecting rod 825 has been inserted through rod receiving apertures throughout pitch 700 and pitch 800. The first pitch 700 also has cylindrical protrusions 710 which may be mated with wedge-shaped protrusions of an adjacent pitch (not shown) in the conveyor belt. Similarly, the second pitch 800 has wedge-shaped protrusions 820 which may be mated with cylindrical protrusions of an adjacent pitch (not shown) in the conveyor belt. Although pitch 700 and pitch 800 are attached by a connecting rod, pitch 700 may rotate about rod 825 independently of pitch 800.

Figure 15:
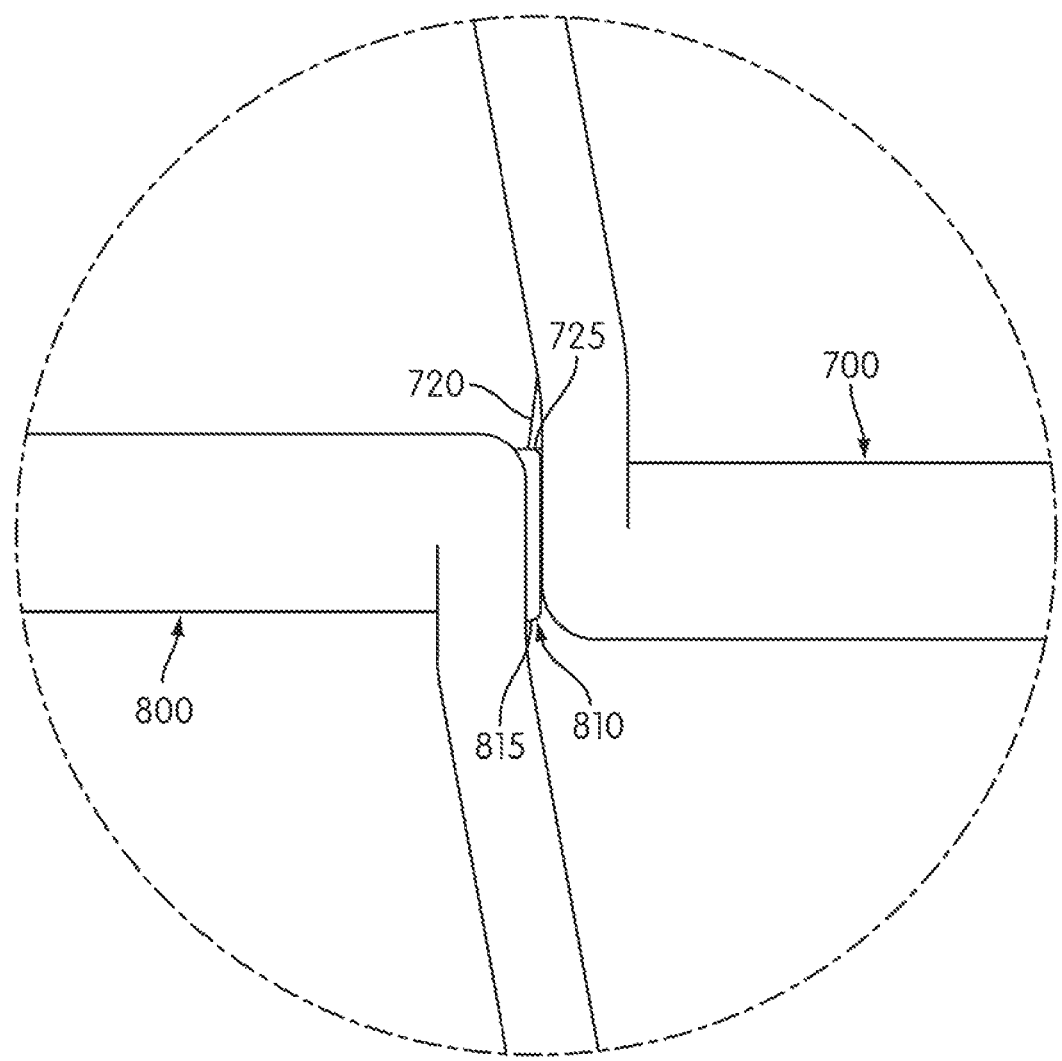
FIG. 15 is an enlarged view of a portion of FIG. 14 showing engaged alignment features of two links.

FIG. 15 is an enlarged view of a portion of FIG. 14. As can be seen in FIG. 15, a mating surface 725 of wedge-shaped member 720 located on first pitch 700 may abut a mating surface 815 of cylindrical protrusion 810 located on second pitch 800. As illustrated in FIG. 15, the lateral facing surface of cylindrical protrusion 810 may serve as a bearing surface as it contacts the lateral facing surface of the link of pitch 700.

Figure 16:
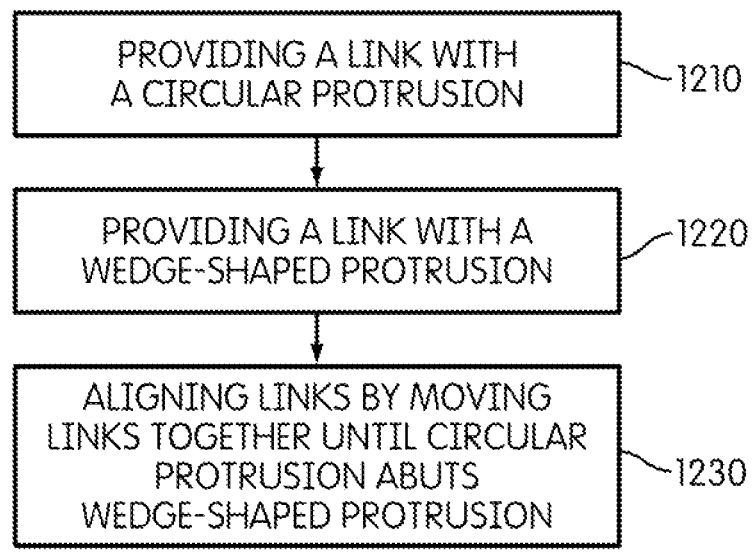
FIG. 16 is a flowchart illustrating an exemplary method for assembling a conveyor belt.

FIG. 16 is a flowchart illustrating steps of an exemplary method for assembling a conveyor belt. The method may include a step 1210 of providing a first link with a circular protrusion. Although step 1210 may involve a link with a circular protrusion, the protrusion may be any other shape forming a mating surface extending a distance from the surface of the link. The method may also include a step 1220 of providing a second link having a wedge-shaped protrusion. Although step 1220 involves a link with a wedge-shaped protrusion, the protrusion may be any other shape forming a mating surface extending a first distance from the surface of the link. The method may also include a step 1230 of aligning the two links by moving the links together until a side surface of the circular protrusion abuts the side surface of the wedge-shaped protrusion.

Figure 17:
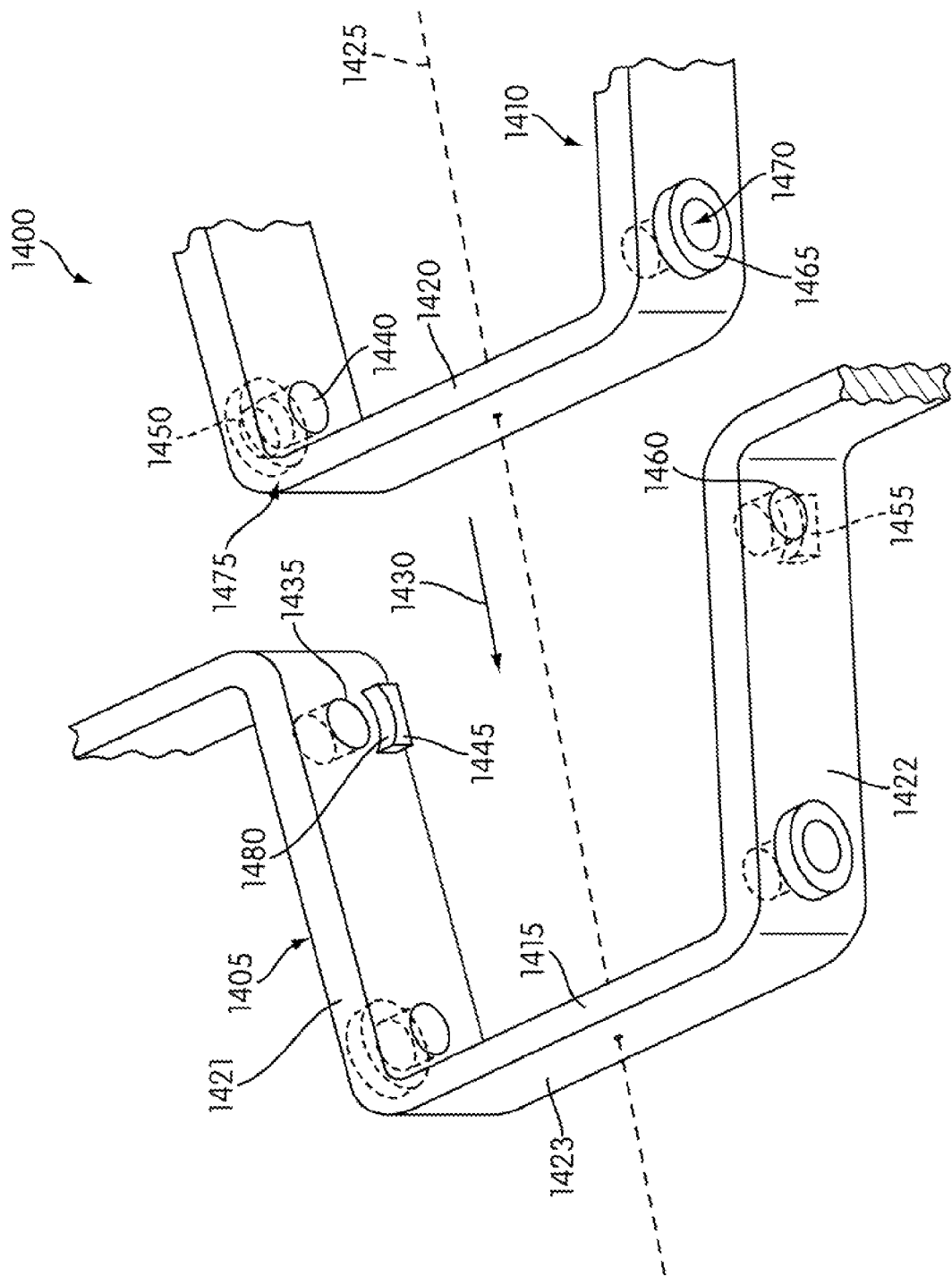
FIG. 17 is a perspective view of two adjoining links of a conveyor belt embodiment including alignment features.

FIG. 17 illustrates another embodiment of a conveyor belt having alignment features. The conveyor belt is shown in FIG. 17 is a flat wire style conveyor belt for simplicity of discussion and illustrations. However, the alignment features included in the embodiment shown in FIG. 17 may be applicable to any other suitable modular conveyor belt.

FIG. 17 illustrates alignment features similar to those shown in FIGS. 6-15. For example, the alignment features may include protrusions disposed on interlinking pitches, wherein the protrusions have mating surfaces configured such that when the pitches are arranged with the mating surfaces abutting, rod receiving apertures in the two pitches are aligned to form a rod receiving path. Once the rod receiving path is formed by aligning the apertures, a connecting rod may be inserted through the apertures. The protrusions may be formed as substantially cylindrical protrusions like the embodiment shown in FIGS. 6-15, and the mating protrusions may include block-shaped protrusions rather than wedge-shaped protrusions. In addition, the block-shaped protrusions may be disposed in longitudinal alignment with the apertures instead of vertical alignment.

As shown in FIG. 17, a modular conveyor belt 1400 may include a first pitch 1405 and a second pitch 1410. First pitch 1405 may include a first link 1415 and second pitch 1410 may include a second link 1420. In some embodiments, the links may be substantially U-shaped. For example, first link 1415 may include a first leg 1421, a second leg 1422, and a connecting portion 1423.

Belt 1400 may be assembled by translating first pitch 1405 and second pitch 1410 relative to one another in a longitudinal direction. For example, in some embodiments, second pitch 1410 may be moved along a longitudinal axis 1425 in a direction indicated by an arrow 1430 to align a first rod receiving aperture 1435 with a second rod receiving aperture 1440. The alignment of apertures 1435 and 1440 may be facilitated by a block-shaped protrusion 1445 disposed proximate to aperture 1435 and a substantially cylindrical protrusion 1450 disposed about aperture 1440.

Aperture 1435 and block-shaped protrusion 1445 may be disposed on first leg 1421 of first link 1415. In some embodiments, corresponding alignment features may also be provided on second leg 1422 of first link 1415. For example, a second block-shaped protrusion 1455 may be disposed proximate to a rod receiving aperture 1460 on first link 1415, and a mating second substantially cylindrical protrusion 1465 may be disposed proximate to a rod receiving aperture 1470 on second link 1420.

It should be noted that, although belt 1400 is illustrated with mating alignment features on each leg of the links, in some embodiments, the alignment features may be provided on only one leg of each link. Further, in some embodiments, every link of each pitch may include alignment features, as shown in the embodiments illustrated in the accompanying figures. However, it will be appreciated that alternative embodiments may include fewer sets of alignment features. For example, in some embodiments alignment features may be provided only on the outermost links or the outermost legs of the outermost links of a pitch. In some embodiments, alignment features may be provided on alternating links. In still other embodiments, alignment features may be provided at the outer edges and in a central portion of the pitches only. In other embodiments, alignment features may be provided at any suitable spaced intervals along the pitches. Also, the alignment features may be the same or different at forward and rearward portions of a given pitch.

Further, in some embodiments, alignment features or other structural features of the pitches may be asymmetrical in various orientations to facilitate correct orientation of components during assembly. In addition, in some embodiments, all pitches of a modular conveyor belt may be identical (and thus include identical alignment features). In other embodiments, a belt may be formed of dissimilar pitches, for example, two alternating pitch structures. In some embodiments, the pitch structures may be the same except for differing alignment features, which may prevent assembly of identical pitches having identical alignment features in adjacent positions on a belt. In some embodiments, different components of a cooperating pair of alignment features may be arranged on the same side of a single link or picket. Further, in some embodiments, identical features may be arranged on all links or pickets on both leading and trailing sides of a pitch, such that the pitch may function identically when reversed about lateral, longitudinal, or vertical axes.

It should also be noted that the alignment features may be disposed on any side of the rod receiving apertures, with the understanding that placement of the alignment features may impact the ability to rotate the links relative to one another once the belt is assembled, which could affect the ability of the belt to flex during conveyance. In addition, alignment features may be formed to allow for a certain amount of play in the components in order to accommodate slight misalignment of components due to manufacturing tolerances.

In some embodiments, an alignment protrusion may be disposed substantially in longitudinal alignment with a rod receiving aperture. For example, as shown in FIG. 17, block-shaped protrusion 1445 may be disposed substantially in longitudinal alignment with aperture 1435. That is, block-shaped protrusion 1445 may be disposed in the same longitudinal position along the longitudinal length of the conveyor belt as aperture 1435.

In some embodiments one or both of the protrusions may have a curved mating surface to enable full rotation of the pitches relative to one another after assembly. For example, in the embodiment shown in FIG. 17, the mating protrusion 1450 has a curved mating surface 1475. Thus, as second pitch 1410 is rotated about a connecting rod inserted through the assembled first and second pitches 1405 and 1410, the distance between the aperture and the portion of the mating surface 1475 closest to a mating surface 1480 of protrusion 1445 is consistent.

Another feature of block-shaped protrusion 1445 is that mating surface 1480 may be curved in a manner corresponding with mating surface 1475 of protrusion 1450. Not only may this curvature of the mating surfaces facilitate rotation of the pitches relative to one another, it may also enable alignment in both the longitudinal and vertical directions. During assembly, the vertical alignment of apertures 1435 and 1440 is provided by the abutting of mating surfaces 1475 and 1480. In addition, the curvature of mating surface 1480 may cradle the substantially cylindrical protrusion 1450, providing an indication of the longitudinal alignment of aperture 1440 with aperture 1435, that is, the longitudinal positioning of first link 1415 relative to second link 1420.

In some embodiments, alignment features may be provided on one pitch that may be configured to abut one or more portions of a second pitch, where the second pitch does not include alignment features configured to mate with the alignment features on the first pitch. For example, in some embodiments, the links may be substantially U-shaped, including a first leg, second leg, and a connecting portion between the legs (the bottom of the U). A first link may include a protrusion that includes a mating surface that is located a predetermined distance from the rod receiving aperture in the first link. Accordingly, the first mating surface of the protrusion may be configured to abut a portion of a second link including a second rod receiving aperture such that, when the first protrusion abuts the portion of the second link, the first rod receiving aperture is substantially aligned with the second rod receiving aperture to form a rod receiving path.

Figure 18:
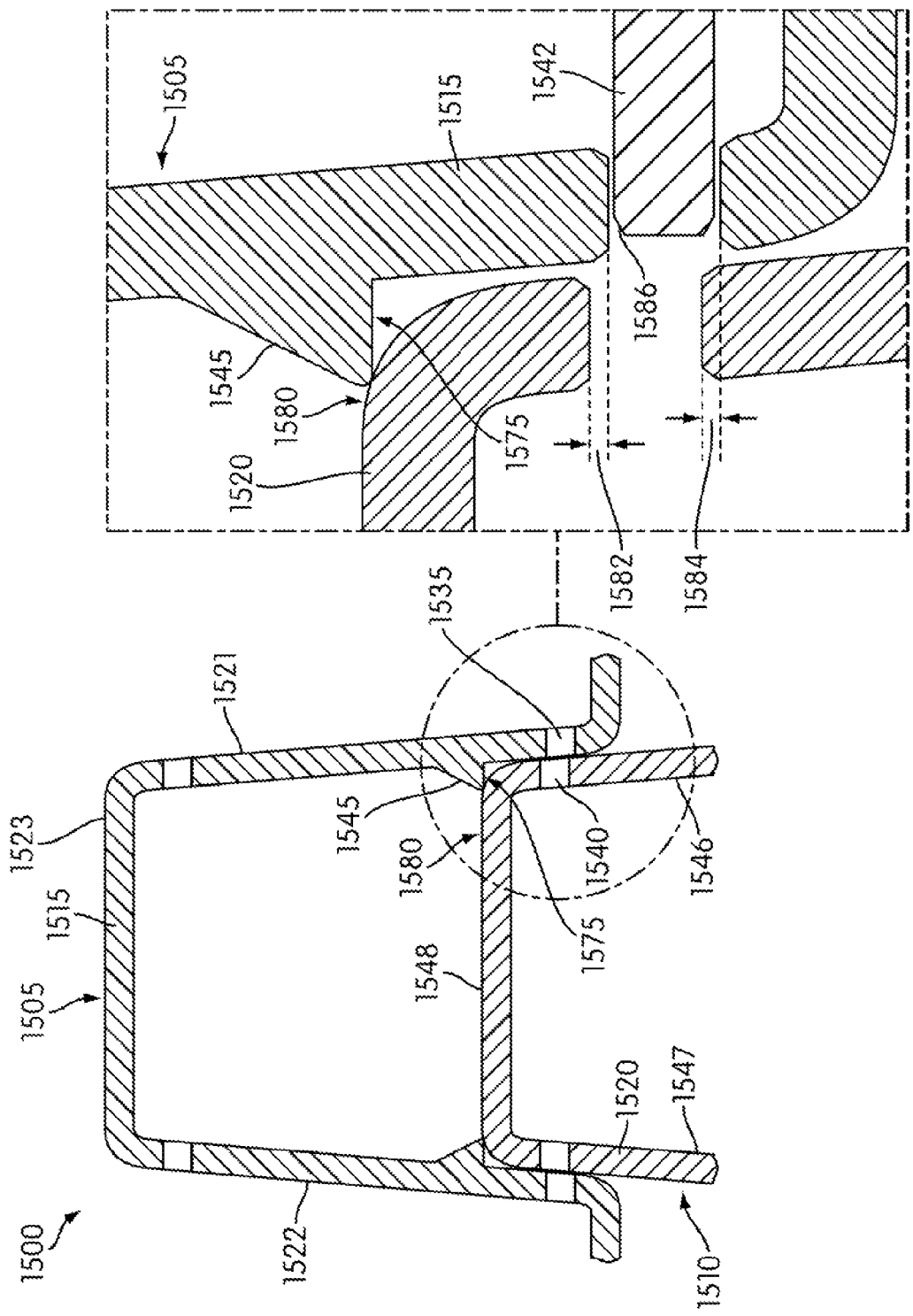
FIG. 18 illustrates enlarged cross-sectional views of links of a conveyor belt embodiment during execution of an alignment procedure using alignment features of the two links.

FIG. 18 illustrates a modular conveyor belt 1500, which may include a first pitch 1505 and a second pitch 1510. First pitch 1505 may include a first link 1515 and second pitch 1510 may include a second link 1520. First pitch 1505 may include a first rod receiving aperture 1535 which may be aligned with a second rod receiving aperture 1540 in order to provide a rod receiving path configured to receive a connecting rod 1542.

The alignment of apertures 1535 and 1540 may be facilitated by a protrusion 1545 disposed proximate to aperture 1535. Protrusion 1545 may have any suitable shape and configuration. For example, as shown in FIG. 18, protrusion 1545 may be substantially wedge-shaped. Wedge-shaped protrusion 1545 may be configured to abut a portion of second link 1520.

In some embodiments, the links may be substantially U-shaped. For example, first link 1515 may include a first leg 1521, a second leg 1522, and a connecting portion 1523. Likewise, second link may include a first leg 1546, a second leg 1547, and a connecting portion 1548 between first leg 1546 and second leg 1547. In some embodiments, wedge-shaped protrusion 1545 may be configured to abut connecting portion 1548 of second link 1520. As illustrated in FIG. 18, wedge-shaped protrusion 1545 may include a first mating surface 1575, which may be configured to abut a second mating surface 1580 of connecting portion 1548 of second link 1520.

In order to avoid binding of the mating surfaces after assembly, which can prevent relative rotation of the pitches, the alignment features may be configured such that links to be joined are positioned with mating surfaces abutted in order to substantially align holes, and then repositioned either by insertion of the connecting rod, which precisely aligns holes, thereby drawing the mating surfaces away from each other slightly, or by rotating the pitches relative to one another. For example, the protrusion may be disposed a predetermined distance from the rod receiving aperture such that, when the mating surfaces abut, the rod receiving apertures are substantially, but not precisely, aligned, and such that when the rod is inserted and the apertures become precisely aligned, the mating surfaces do not abut. In order to facilitate insertion of the rod when the apertures are substantially, but imprecisely, aligned, the leading end of the rod and/or the edges of one or both apertures may be beveled or chamfered.

FIG. 18 illustrates an embodiment in which the alignment feature mating surfaces may be abutted to substantially align the apertures in links to be joined, and then drawn out of abutment by the precise alignment of the apertures caused by insertion of the connecting rod. For example, when second mating surface 1580 of wedge-shaped protrusion 1545 abuts first mating surface 1575 of connecting portion 1548 of second link 1520, second link 1520 may be nested between first leg 1521 and second leg 1522 of first link 1515 and first rod receiving aperture 1535 may be in substantial alignment with second rod receiving aperture 1540. In some embodiments, When second mating surface 1580 of wedge-shaped protrusion 1545 abuts first mating surface 1575 of connecting portion 1548 of second link 1520, second link 1520 may be nested between first leg 1521 and second leg 1522 of first link 1515 further in a longitudinal direction than when first rod receiving aperture 1535 and second rod receiving aperture 1540 are precisely aligned.

The substantial (but imprecise) alignment is illustrated in FIG. 18 by dimensions 1582 and 1584. In order to facilitate insertion of connecting rod 1542 while apertures 1535 and 1540 are substantially (but imprecisely) aligned, in some embodiments, rod 1542 may include a beveled tip 1586. Alternatively, or additionally, aperture 1540 and/or aperture 1535 may be beveled (chamfered), as shown in FIG. 18. In some embodiments, the alignment features may be configured to position apertures 1535 and 1540 into alignment within up to one half the diameter of rod 1542. Accordingly, in some embodiments, the bevels/chamfers on rod 1542 and/or apertures 1535 and 1540 may be up to half the diameter of the rod. In some embodiments, bevels/chamfers may be provided to accommodate for misalignments due to variations in manufacturing regardless of whether any purposeful misalignment is provided by the alignment features.

Once rod 1542 is fully inserted, aperture 1535 and aperture 1540 may become precisely aligned by longitudinally translating second link 1520 relative to first link 1515 slightly. Accordingly, a space equivalent to dimension 1582 (and dimension 1584) will be provided between mating surface 1575 and 1580, thereby allowing rotation of first pitch 1505 relative to second pitch 1510.

In some embodiments, alignment features may be engaged with one another, such that mating surfaces are abutting, in order to align rod receiving apertures. This step may be performed with the links oriented orthogonal (perpendicular) to one another. Once the rod is inserted, the pitches may be rotated about the connecting rod, thereby disengaging the alignment features and enabling free rotation of the pitches relative to one another in a predetermined range of motion.

In some embodiments at least one of the alignment features may include a recess. For example, a first link may include a recess in a surface of the first link, wherein the recess includes a first mating surface. The recess may be disposed proximate a first rod receiving aperture extending through the first link. In addition, at least one of the alignment features may include a protrusion that engages the recess. For example, a second link may include a protrusion extending a second distance from a surface of the second link, wherein the protrusion includes a second mating surface. The protrusion may be disposed proximate a second rod receiving aperture extending through the second link, wherein, when the protrusion is engaged with the recess, the first mating surface of the recess abuts the second mating surface of the protrusion.

When the protrusion is engaged with the recess, the first link may be in substantial non-alignment with the second link. For example, in some embodiments, when the protrusion is engaged with the recess, the first link may be oriented substantially orthogonal to the second link. After insertion of a connecting rod through the apertures of the first link and the second link, the links may be rotated such that the first link is oriented in substantial alignment with the second link. In this arrangement (i.e., when the first link is oriented in substantial alignment with the second link), the protrusion on the second link may be longitudinally spaced from the first link allowing rotation of the second link relative to the first link about the connecting rod over a predetermined range of motion.

Figure 19:
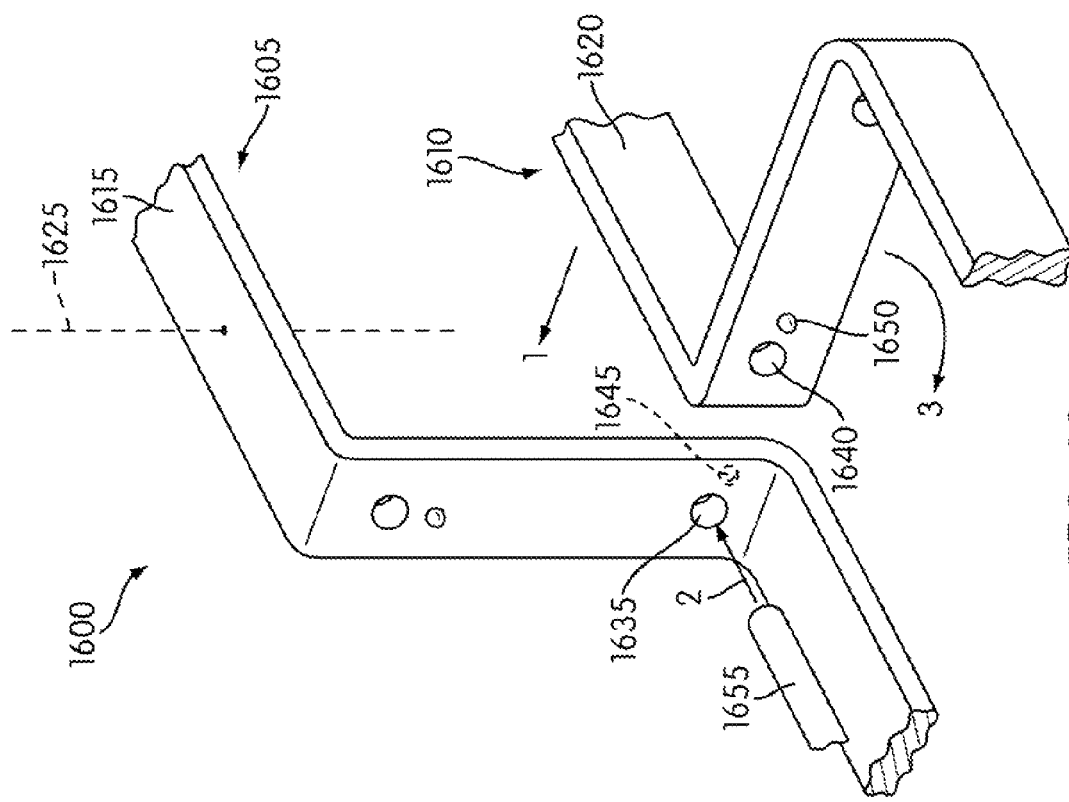
FIG. 19 is a perspective view of two adjoining links of a conveyor belt embodiment including alignment features.

FIG. 19 illustrates an exemplary conveyor belt embodiment with alignment features including a recess and a mating protrusion. For example, FIG. 19 shows a modular conveyor belt 1600, including a first pitch 1605 and a second pitch 1610. First pitch 1605 may include a first link 1615 and second pitch 1610 may include a second link 1620 configured to be longitudinally aligned along a longitudinal axis 1625. First link 1615 may include a first rod receiving aperture 1635 and second link 1620 may include a second rod receiving aperture 1640.

First link 1615 may include a recess 1645. Second link 1620 may include a protrusion 1650 configured to engage with recess 1645. Recess 1645 and protrusion 1650 may have any suitable mating shapes. For example, as shown in FIG. 19, recess 1645 and protrusion 1650 may be substantially hemispherical. Other possible mating shapes will be recognized by those having ordinary skill in the art. In addition, it will also be recognized that the degree to which protrusion 1650 and recess 1645 are engaged may vary. In some embodiments, substantially the entire protrusion 1650 may be disposed within recess 1645 when the two components are engaged. In other embodiments, only a portion of protrusion 1650 may be disposed within recess 1645 when the two components are engaged.

In some embodiments, as shown in FIG. 19, recess 1645 may be disposed proximate to aperture 1635 in longitudinal alignment with aperture 1635. As shown in the illustrated embodiment, protrusion 1650 may be disposed proximate to aperture 1640 in vertical alignment with aperture 1640. With this configuration, protrusion 1650 may be engaged with recess 1645 in order to align apertures 1635 and 1640 to create a rod receiving path through apertures 1635 and 1640. Accordingly, the alignment may be achieved when first pitch 1605 (and therefore first link 1615) is oriented at a substantially orthogonal (perpendicular) angle with respect to second pitch 1610 (and therefore second link 1620). In other embodiments, however, the recess and/or protrusion may be located such that mating engagement (and therefore alignment of the apertures) is achieved with the first pitch and the second pitch oriented at a different non-zero angle relative to one another.

The step of aligning aperture 1635 with aperture 1640 by engagement of protrusion 1650 with recess 1645 while first pitch 1605 is oriented orthogonal to second pitch 1610 is illustrated by an arrow labeled "1" in FIG. 19. After apertures 1635 and 1640 are aligned, a connecting rod 1655 may be inserted through apertures 1635 and 1640, as illustrated by a second arrow, labeled "2" in FIG. 19. Once connecting rod 1655 is inserted, second pitch 1610 may be rotated about connecting rod 1655 relative to first pitch 1605, as indicated by a third arrow, labeled "3" in FIG. 19. By rotating second pitch 1610, protrusion 1650 may be disengaged from recess 1645.

Figure 20:
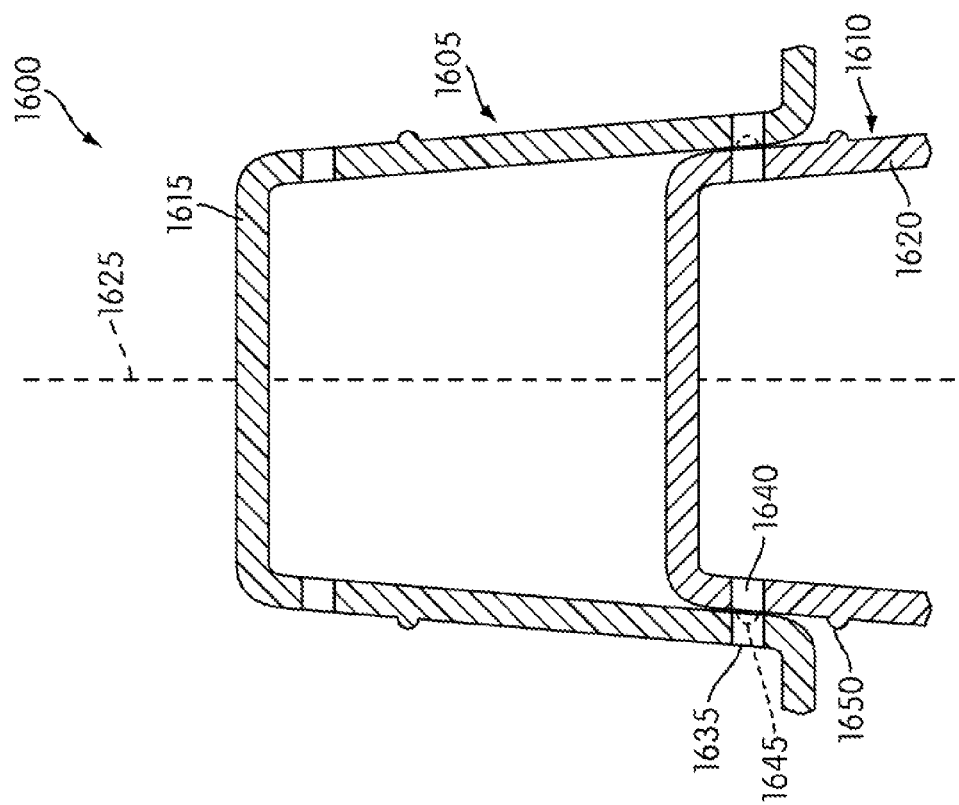
FIG. 20 is a cross-sectional view of the links of the embodiment shown in FIG. 19.

As illustrated in FIG. 20, upon completion of this third step, first pitch 1605 and second pitch 1610 may be in substantial alignment. As shown in FIG. 20, in this post-assembly configuration, protrusion 1650 may be located longitudinally spaced from first pitch 1605 in order to allow free rotation of the pitches relative to one another in a predetermined range of rotational motion. In addition, in some embodiments, second rod receiving aperture 1640 may be a longitudinally elongate slot, which may enable collapsibility of belt 1600. In such embodiments, the longitudinal spacing between protrusion 1650 and first pitch 1605 when first pitch 1605 and second pitch 1610 are in alignment may be large enough to allow collapsing of first pitch 1605 and second pitch 1610.

Further, in an alternative embodiment, recess 1645 may be disposed in vertical alignment with aperture 1635. In such an embodiment, engagement of protrusion 1650 with recess 1645 may occur when first pitch 1605 and second pitch 1610 are oriented in substantial alignment with each other. In order to facilitate rotation of first pitch 1605 relative to second pitch 1610 about connecting rod 1655 after assembly, in some embodiments, the engagement of protrusion 1650 with recess 1645 may be minimal, such that the elements disengage readily during relative rotation of pitches 1605 and 1610.

In some embodiments, protrusion 1650 may be frangible. For example, once alignment of the apertures is accomplished by engaging protrusion 1650 with recess 1645, relative rotation of pitches 1605 and 1610 causes protrusion 1650 to break off, enabling free rotation of first pitch 1605 relative to second pitch 1610. Protrusion 1650 may be rendered frangible by any suitable means. For example, the junction between protrusion 1650 and second link 1620 may be weakened in some way, such as with perforations and/or being formed by a thinner piece of material that is readily breakable without damaging the portion of the link to which protrusion 1650 is attached. Alternatively, in some embodiments, protrusion 1650 may be formed of a soluble material. After assembly of the belt, the belt may be dipped in, or sprayed with, a solvent which dissolves protrusion 1650 but does not affect the rest of the conveyor belt components.

In some embodiments, frangible type alignment features may be configured such that the belt may be used without breaking off the frangible components. In such cases, the user may have the option as to whether they want to break off the frangible alignment feature or use the belt with the frangible alignment feature intact. In some embodiments, leaving the frangible alignment features intact may result in a belt that has limited flexibility and/or collapsibility, which may be satisfactory or preferred for certain applications. Leaving the frangible alignment features intact if breakage is not necessary may facilitate replacement of components and service generally. Reassembly of a belt that has been disassembled for service may be easier and faster if the frangible alignment features are left intact. For other applications, however, it may be preferred to break off the frangible alignment features in order to allow an increased range of motion of the belt components relative to one another. For example, removal of frangible alignment features may enable relative rotation, or a greater range of relative rotation, of pitches with respect to one another, as well as longitudinal collapsibility of pitches relative to one another. Collapsibility may enable belts to navigate turns and other aspects of tortuous conveyor paths.

Other types of frangible alignment features are also envisaged. An exemplary modular conveyor belt may include a first link having a first rod receiving aperture and a frangible tab extending from a surface of the first link. The frangible tab may include a first mating surface located a predetermined distance from the first rod receiving aperture. The first mating surface of the frangible tab may be configured to abut a portion of a second link including a second rod receiving aperture. When the first protrusion abuts the portion of the second link, the first rod receiving aperture may be substantially aligned with the second rod receiving aperture to form a rod receiving path.

In some embodiments a frangible tab may be disposed on an inner surface of a first substantially U-shaped link. The tab may serve to limit nesting of a second link within the first link in order to align the rod receiving apertures. In such an embodiment, the aperture on the second link may be a longitudinally elongate slot. Once the connecting rod is inserted through the apertures, the links may be squeezed to force the second link further into nesting engagement with the first link and, in doing so, break off the frangible tab. Breaking off of the tab may enable free rotation of the links relative to one another as well as longitudinal collapsibility.

Each of the links may be substantially U-shaped, including a first leg, a second leg, and a connecting portion. The frangible tab of the first link may be configured to abut the connecting portion of the second link when the second link is nested between the first leg and the second leg of the U-shaped first link in an abutting position. In some embodiments, the second rod receiving aperture may be a longitudinally elongate slot, and the frangible tab may be configured to be broken off by longitudinally translating the second link from the abutting position to a second position in which the second link is nested further within the first link.

Figure 21:
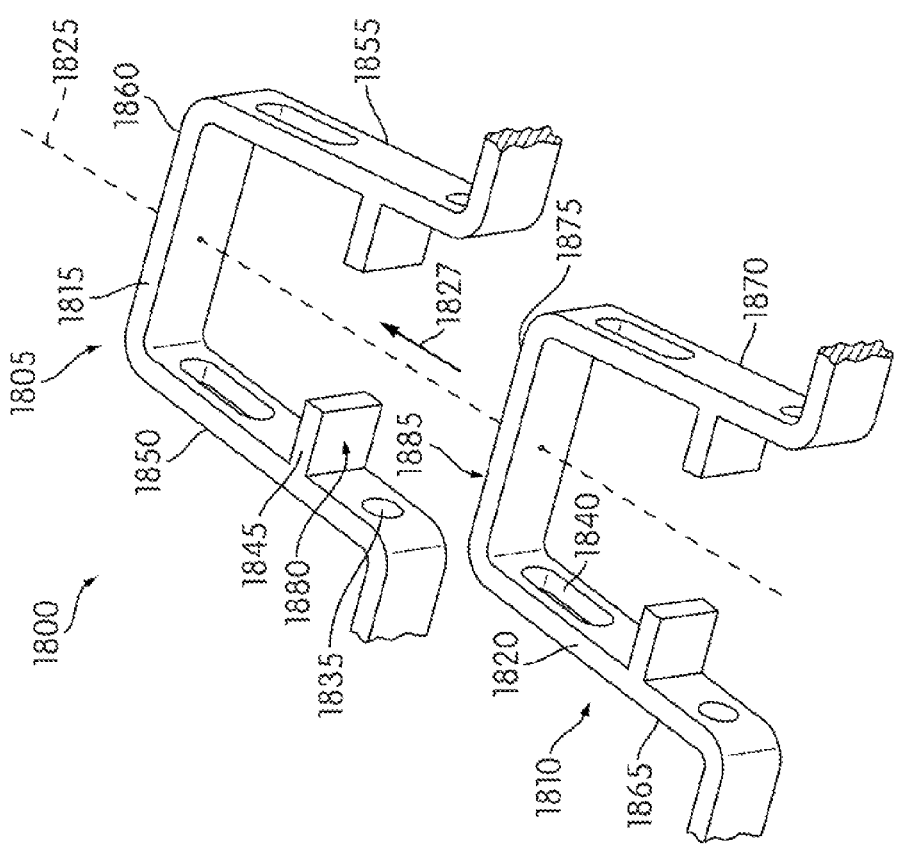
FIG. 21 is a perspective view of two adjoining links of a conveyor belt embodiment including frangible alignment features.

FIG. 21 illustrates an exemplary conveyor belt embodiment with frangible alignment features. FIG. 21 shows a modular conveyor belt 1800, including a first pitch 1805 and a second pitch 1810. First pitch 1805 may include a first link 1815 and second pitch 1810 may include a second link 1820 configured to be longitudinally aligned along a longitudinal axis 1825. First link 1815 and second link 1820 may be brought into engagement, for example, by translating second link 1820 in a longitudinal direction indicated by arrow 1827. In some embodiments, either or both first link 1815 and second link 1820 may be longitudinally translated to bring the two links into engagement. First link 1815 may include a first rod receiving aperture 1835 and second link 1820 may include a second rod receiving aperture 1840. In addition, first link 1815 may include a frangible tab 1845.

As shown in FIG. 21, in some embodiments, first link 1815 and second link 1820 may be substantially U-shaped. For example, first link 1815 may include a first leg 1850, a second leg 1855, and a connecting portion 1860 between first leg 1850 and second leg 1855. Similarly, second link 1820 may include a first leg 1865, a second leg 1870, and a connecting portion 1875 between first leg 1865 and second leg 1870.

Frangible tab 1845 may include a first mating surface 1880, which may be configured to abut a second mating surface 1885 of connecting portion 1875 of second link 1820. Similar to the embodiment shown in FIG. 18, frangible tab 1845 may be disposed a predetermined distance from first aperture 1835 such that when second link 1820 is brought into contact with mating surface 1880 of frangible tab 1845 by translating in the longitudinal direction (indicated by arrow 1827), apertures 1835 and 1840 may be substantially aligned, creating a rod receiving path.

Figure 22:
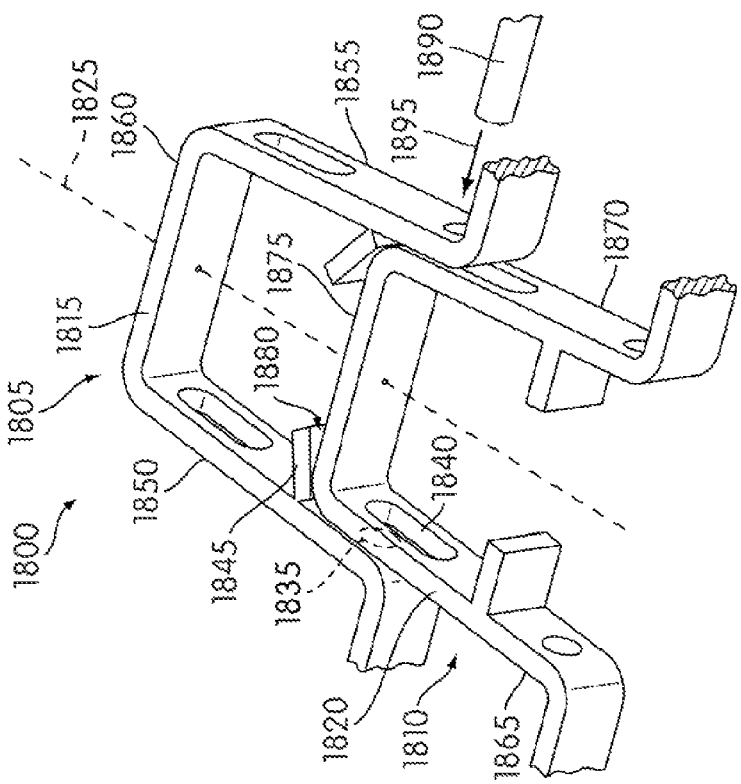
FIG. 22 illustrates assembly of the links shown in FIG. 21.

As shown in FIG. 22, once apertures 1835 and 1840 are substantially aligned, a connecting rod 1890 may be inserted in a direction indicated by an arrow 1895 through apertures 1835 and 1840. In addition, after connecting rod 1890 has been inserted, because second aperture 1840 may be a longitudinally elongate slot, second link 1820 may be translated further longitudinally toward first link 1815 to break frangible tab 1845, thereby enabling free rotation of first pitch 1805 relative to second pitch 1810 about connecting rod 1890. In addition, removal of frangible tab 1845 may also render conveyor belt 1800 collapsible.

Figure 25:
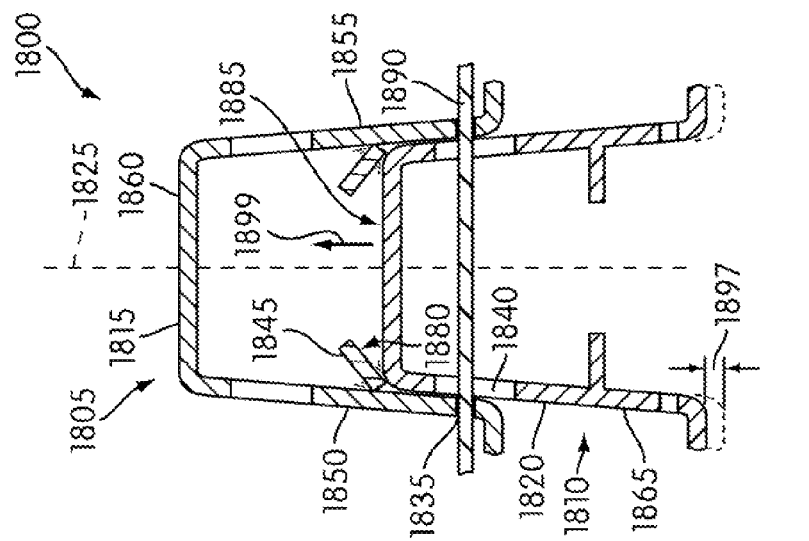
FIG. 25 illustrates the process of breaking the frangible alignment features of the embodiment shown in FIG. 23.
Figure 24:
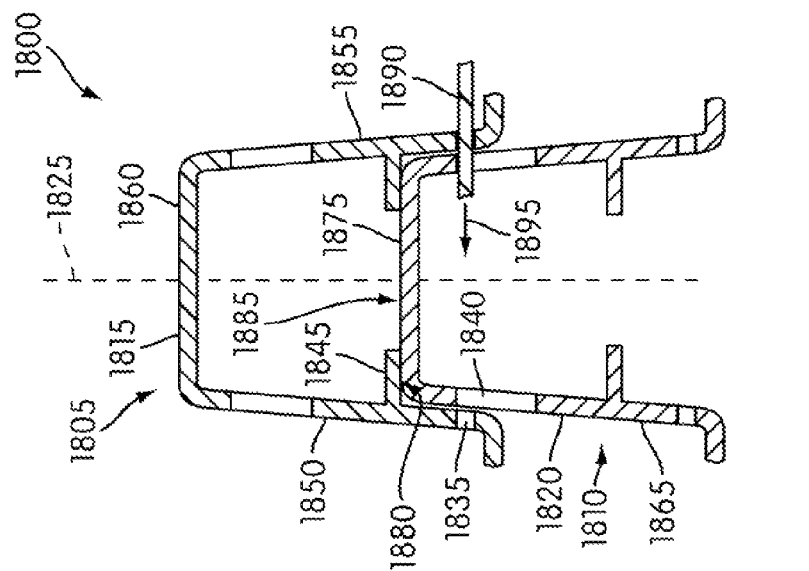
FIG. 24 illustrates assembly of the links shown in FIG. 23 using the frangible alignment features.
Figure 23:
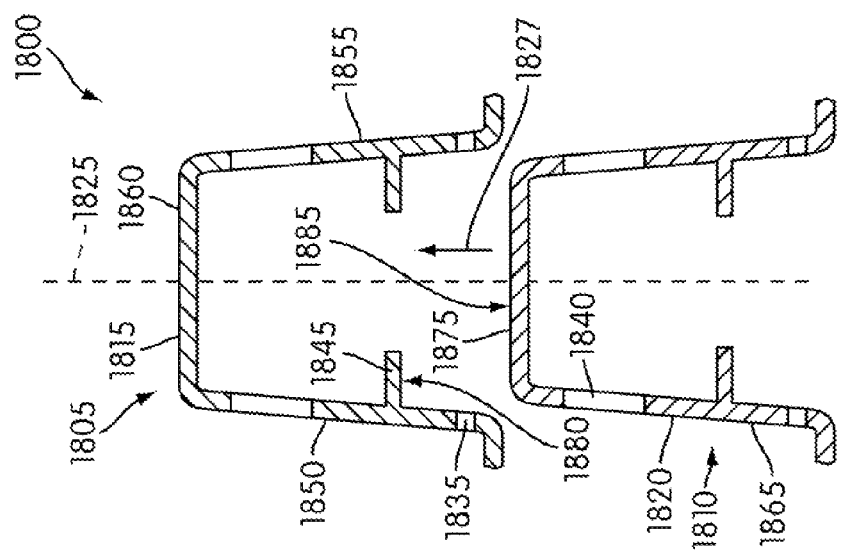
FIG. 23 is a cross-sectional view of two adjoining links of a conveyor belt embodiment including frangible alignment features.

FIGS. 23-25 are cross-sectional views illustrating the process of assembling links 1815 and 1820. As shown in FIG. 23, second link 1820 may be translated in a longitudinal direction, indicated by arrow 1827 to nest within first link 1815. FIG. 24 illustrates second link 1820 positioned with second mating surface 1885 of connecting portion 1875 abutting first mating surface 1880 of frangible tab 1845. As shown in FIG. 24, when first mating surface 1880 abuts second mating surface 1885, apertures 1835 and 1840 may be substantially aligned, creating a rod receiving path, enabling connecting rod 1890 to be inserted in the direction indicated by arrow 1895.

As shown in FIG. 25, once connecting rod 1890 has been inserted, second link 1820 may be translating at least a predetermined distance (indicated by a dimension 1897 in FIG. 25) in a direction indicated by an arrow 1899 in order to break frangible tab 1845 off of first link 1815. This is enabled by the fact that second rod receiving aperture is a longitudinally elongate slot, thus allowing second link 1820 to be translated longitudinally over a range of motion while connecting rod 1890 remains stationary. Once frangible tab 1845 has been broken off, first and second links 1815 and 1820 may be free to be articulated longitudinally and rotationally relative to one another over a more extensive range of motion in order to enable conveyance along a tortuous conveyor belt path.

Frangible tab 1845 may be rendered frangible by any suitable means. In some embodiments, the junction between frangible tab 1845 and first link 1815 may be weakened in some way. For example, in some embodiments, this junction may be perforated. In other embodiments, this junction may simply be a thinner region of material. In still other embodiments, this junction may be both thinner and perforated. Alternatively, in some embodiments at least a portion of frangible tab 1845 may be soluble in a solution in which the rest of the conveyor belt components are not soluble. Once assembled, frangible tab 1845, or the junction between frangible tab 1845 and first link 1815, may be dissolved away using a solution. Those having ordinary skill in the art will recognize other possible ways in which a tab can be rendered frangible.

Figure 26:
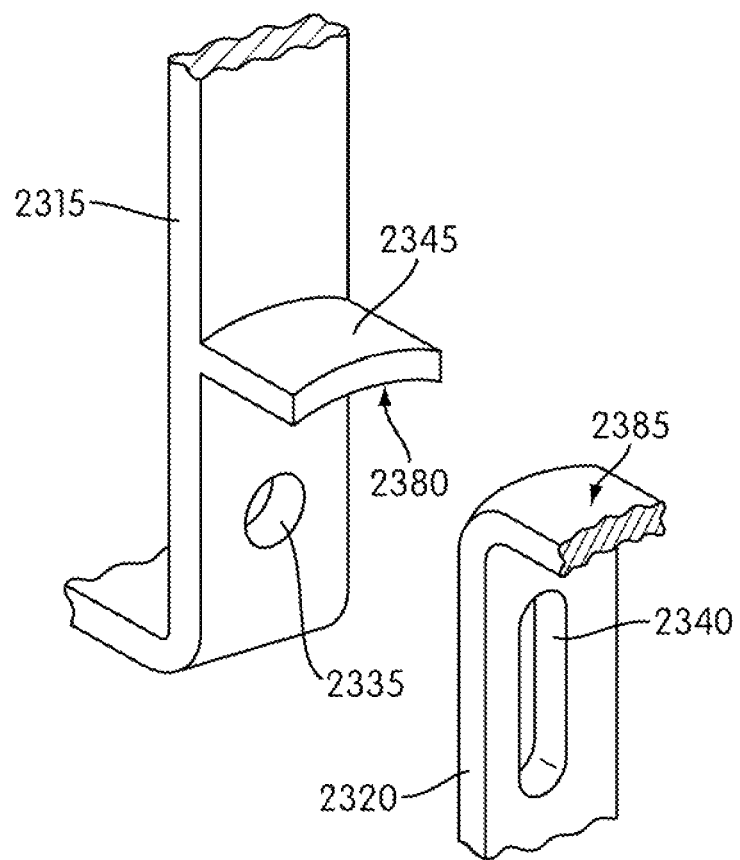
FIG. 26 is an alternative embodiment of a frangible alignment feature.

In some embodiments, the mating surface of a frangible tab attached to a first link may be curved to mate with a corresponding surface of a second link. FIG. 26 illustrates an alternative shape for a frangible tab. Specifically, FIG. 26 shows a first link 2315 and a second link 2320. First link 2315 may include a first rod receiving aperture 2335 and second link 2320 may include a second aperture 2340. First link 2315 may include a frangible tab 2345, having a first mating surface 2380, which may be configured to abut a second mating surface 2385 of second link 2320. As shown in FIG. 26, first mating surface 2380 and second mating surface 2385 may be curved.

The curvature of the mating surfaces may facilitate alignment in a vertical direction. For example, the concave curvature of first mating surface 2380 may cradle second mating surface 2385 of second link 2320, preventing undesired vertical shifting of second link 2320 relative to first link 2315 during assembly.

In some embodiments, frangible alignment features may be provided that may be broken off by relative rotation of the pitches rather than longitudinal translation of the pitches with respect to one another. For example, in some embodiments, a U-shaped receiving member may be disposed on a first link and a frangible tab may be oriented longitudinally on a second link, where the receiving member may be configured to receive the frangible tab upon longitudinal translation of the second link into engagement with the first link. The frangible tab and the receiving member may have mating surfaces that, when abutted, result in the alignment of a first rod receiving aperture on the first link with a second rod receiving aperture on the second link. A connecting rod may be inserted through the aligned apertures to assemble the pitches of the conveyor belt. Once the rod has been inserted, the pitches may be rotated relative to one another to snap off the frangible tab.

Figure 27:
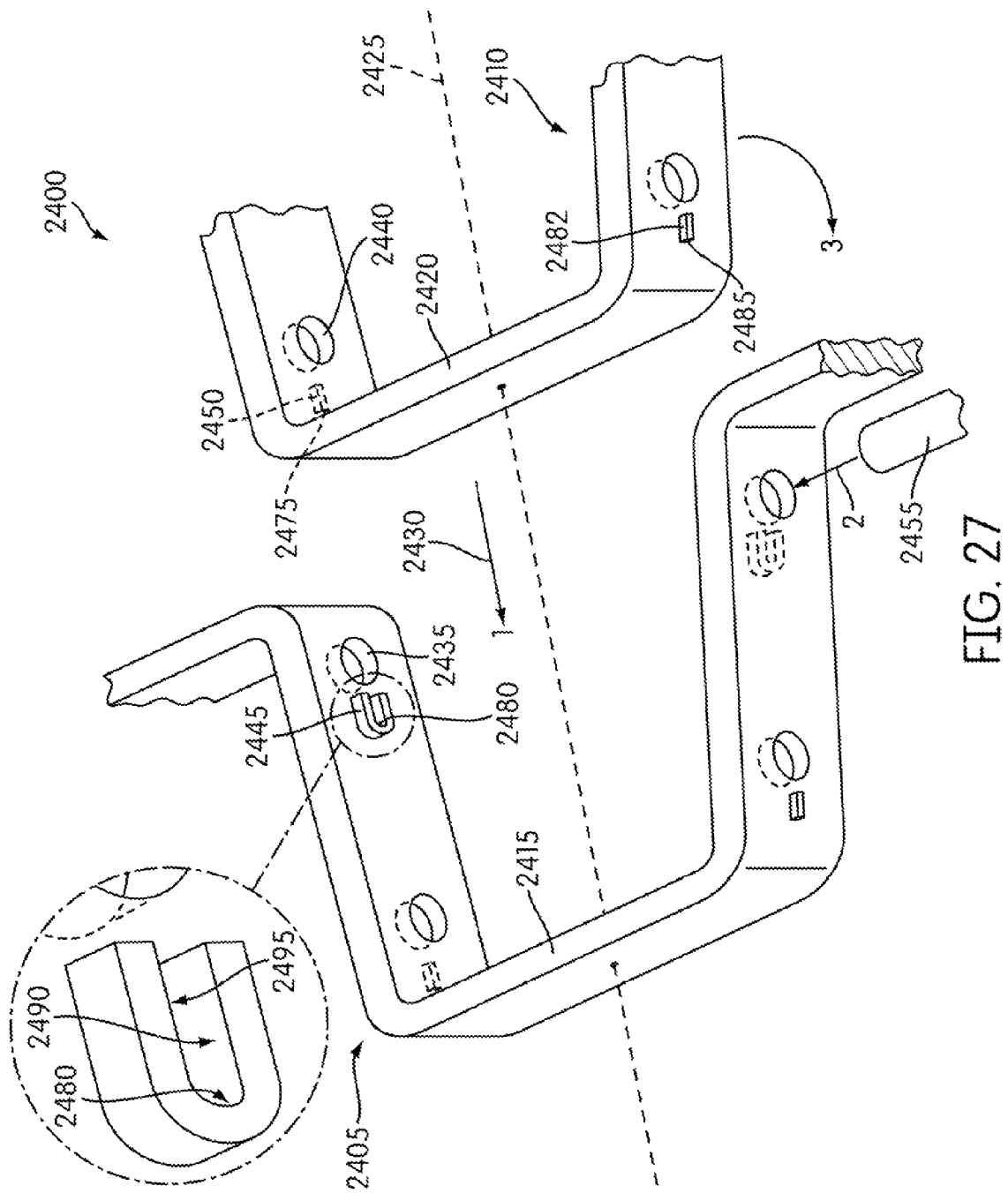
FIG. 27 is a perspective view of two adjoining links of a conveyor belt embodiment including frangible alignment features.

FIG. 27 illustrates an embodiment including a frangible alignment feature. FIG. 27 shows a modular conveyor belt 2400, which may include a first pitch 2405 and a second pitch 2410. First pitch 2405 may include a first link 2415 and second pitch 2410 may include a second link 2420 configured to be longitudinally aligned along a longitudinal axis 2425. First link 2415 and second link 2420 may be brought into engagement, for example, by translating second link 2420 in a longitudinal direction indicated by arrow 2430. First link 2415 may include a first rod receiving aperture 2435 and second link 2420 may include a second rod receiving aperture 2440.

As shown in FIG. 27, first link 2415 may include a receiving member 2445 disposed at a predetermined distance from first rod receiving aperture 2435. Receiving member 2445 may be configured to receive a longitudinally oriented frangible tab 2450 extending from a surface of second link 2420. When frangible tab 2450 is received within receiving member 2445, first rod receiving aperture 2435 may be substantially aligned with second rod receiving aperture 2440 to form a rod receiving path. The step of bringing second link 2420 into engagement with first link 2415 may be executed, for example, by longitudinally translating in the direction of arrow 2430. The action associated with this first step is further labeled "1" in FIG. 27. When apertures 2435 and 2440 are substantially aligned, a connecting rod 2455 may be inserted through apertures 2435 and 2440. This second step of inserting connecting rod 2455 is illustrated in FIG. 27 with an arrow labeled "2" in FIG. 27. Once frangible tab 2450 is received within receiving member 2445 and connecting rod 2455 is inserted through apertures 2435 and 2440, frangible tab 2450 may be broken off by rotating second link 2420 relative to first link 2415. Frangible tab 2450 may be retained within receiving member 2445 while the rest of second link 2420 is rotated relative to first link 2415, thereby causing frangible tab 2450 to be broken off. This third step is illustrated by an arrow labeled "3" in FIG. 27.

Receiving member 2445 may include a first mating surface 2480, which may be located a predetermined distance from first rod receiving aperture 2435. Frangible tab 2450 may include a second mating surface 2475, which may be located a predetermined distance from second rod receiving aperture. For clearer illustration, reference may be made to a second frangible tab 2482, having a mating surface 2485.

In some embodiments, receiving member 2445 may include a substantially U-shaped protrusion extending from a surface of first link 2415. Accordingly, the U-shape may be configured to align second link 2420 relative to first link 2415 in both vertical and longitudinal directions when frangible tab 2450 is received within receiving member 2445. Frangible tab 2450 may be maintained in vertical alignment with aperture 2435 by a lower mating surface 2490 and an upper mating surface 2495, which may restrict the vertical movement of frangible tab 2450 when received within receiving member 2445. The amount of play between frangible tab 2450 and lower and upper mating surfaces 2490 and 2495 may vary. In some cases the fit between these components may be relatively snug, like a press-fit. In such cases, frangible tab 2450 may be retained within receiving member 2445 when broken off. In other cases, the fit of frangible tab 2450 within receiving member 2445 may be relatively loose, while still limiting the movement of frangible tab in order to maintain alignment of apertures 2435 and 2440.

Frangible tab 2445 may be rendered frangible by any suitable means. In some embodiments, the junction between frangible tab 2445 and second link 2420 may be weakened in some way. For example, in some embodiments, this junction may be perforated. In other embodiments, this junction may simply be a thinner region of material. In still other embodiments, this junction may be both thinner and perforated. Alternatively, in some embodiments at least a portion of frangible tab 2445 may be soluble in a solution in which the rest of the conveyor belt components are not soluble. Once assembled, frangible tab 2445, or the junction between frangible tab 2445 and second link 2420, may be dissolved away using a solution. Those having ordinary skill in the art will recognize other possible ways in which a tab can be rendered frangible.

Figure 28:
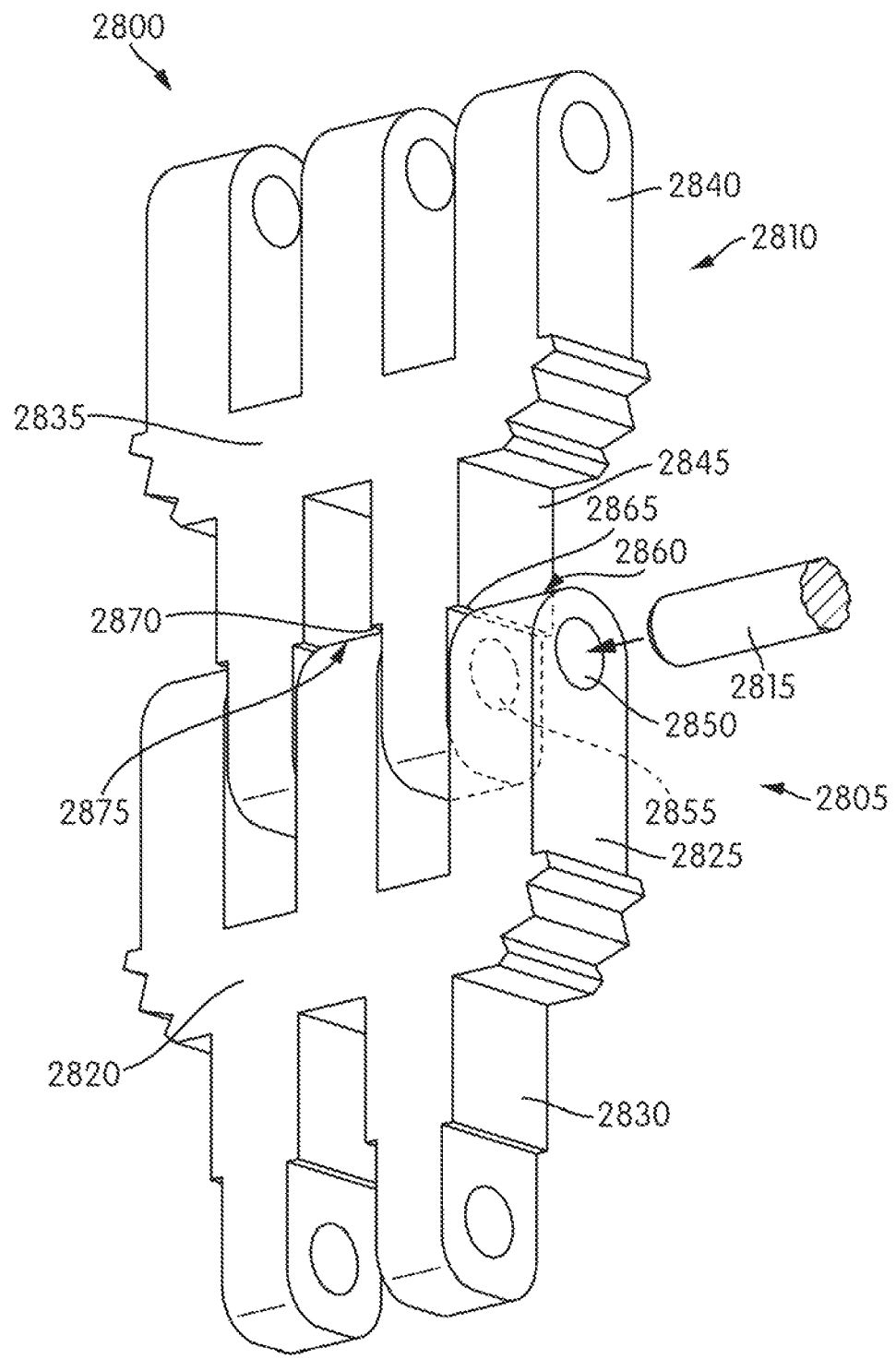
FIG. 28 is a perspective view of adjacent links of an exemplary finger style conveyor belt including alignment features.

FIG. 28 illustrates an exemplary finger style conveyor belt 2800 embodiment including alignment features. Conveyor belt 2800 may include a first pitch including a first link 2805 and a second pitch including a second link 2810. The first pitch including first link 2805 and the second pitch including second link 2810 may be joined by a connecting rod 2815. First link 2805 may include a central transverse rib 2820. First link 2805 may further include at least one finger-like, forward extending link leg 2825 extending from transverse rib 2820 in a forward direction, and at least one finger-like, rearward extending link leg 2830 extending from transverse rib 2820 in a rearward direction. Second link 2810 may include a central transverse rib 2835. Second link 2810 may further include at least one finger-like, forward extending link leg 2840 and at least one finger-like, rearward extending link leg 2845.

Forward extending link leg 2850 of first link 2805 may include a first rod receiving aperture 2850 extending through leg 2850 of first link 2805, and rearward extending link leg 2845 may include a second rod receiving aperture 2855. Apertures 2850 and 2855, when aligned, form a rod receiving path, through which connecting rod 2815 may be inserted to attach first link 2805 and 2810. It shall be noted that, in some embodiments, transverse rib 2820 may be disposed between adjacent connecting rods 2815, as is typical for a finger style belt.

In order to facilitate alignment of apertures 2850 and 2855, in some embodiments, first link 2805 and/or second link 2810 may include one or more alignment features. For example, in some embodiments, forward extending link leg 2825 of first link 2805 and/or rearward extending link leg 2845 of second link 2810 may include one or more shoulders forming mating surfaces that may be configured to abut one or more portions of the adjacent link. Such shoulders could, for example, serve similar purposes as cylindrical protrusions and/or wedge shaped protrusions discussed above.

As shown in FIG. 28, first link 2805 may include a first mating surface 2860, which may be configured to abut a second mating surface 2865 of rearward extending leg 2845 of second link 2810. First mating surface 2860 may be disposed proximate first rod receiving aperture 2850 and second mating surface 2865 may be disposed proximate second rod receiving aperture 2855. In some embodiments, first mating surface 2860 may be substantially planar. In other embodiments, first mating surface 2860 may be curved or rounded, as shown in FIG. 28. In addition, although second mating surface 2865 is shown in FIG. 28 as being substantially planar, in some embodiments, second mating surface 2865 may be curved. For example, second mating surface 2865 may be curved to mate with curved first mating surface 2860. In some embodiments, first mating surface 2860 may at least partially surround first rod receiving aperture 2850. For example, as shown in FIG. 28, first mating surface 2860 may be substantially concentric with first rod receiving aperture 2850. Curved mating surfaces may enable rotation of first link 2805 and second link 2810 relative to one another in a manner similar to other embodiments discussed above.

Second mating surface 2865 may be formed by a shoulder that extends, for example, less than 1 mm away from the surface of link leg 2845. In addition, link leg 2845 may also include a second shoulder forming a third contact surface 2870, which may be configured to abut a contact surface 2875 of first link 2805, as shown in FIG. 28.

Figure 29:
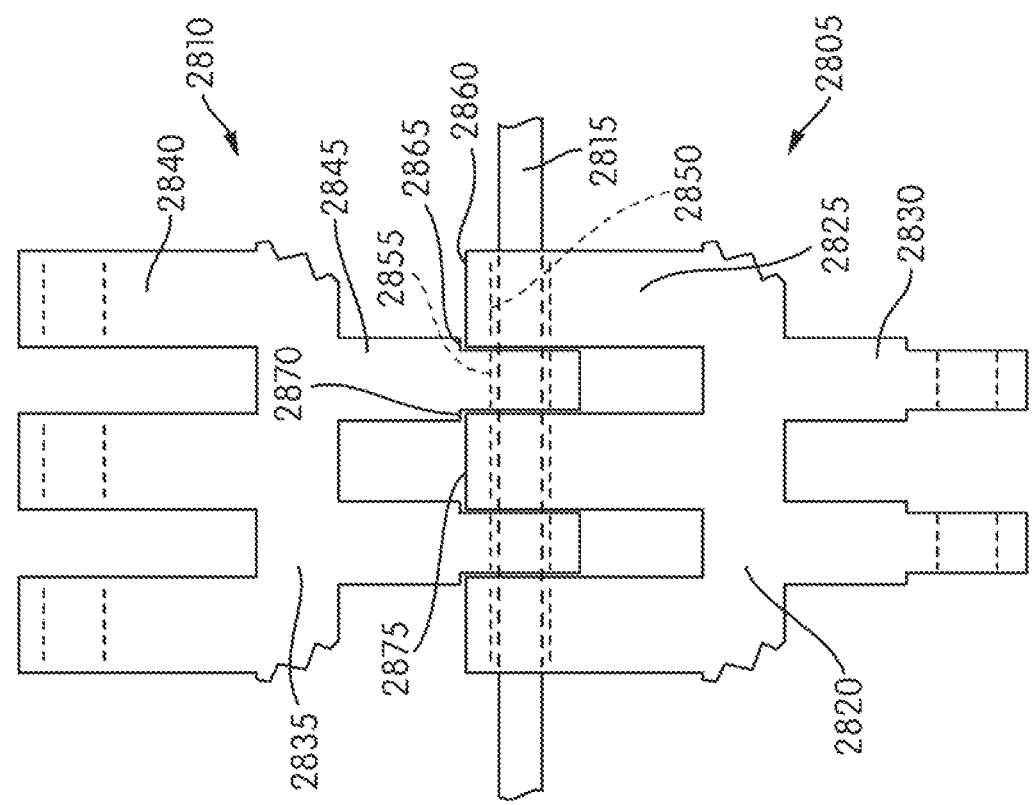
FIG. 29 is a plan view of the embodiment shown in FIG. 28.

FIG. 29 illustrates a plan view of the embodiment shown in FIG. 28.

Figure 30:
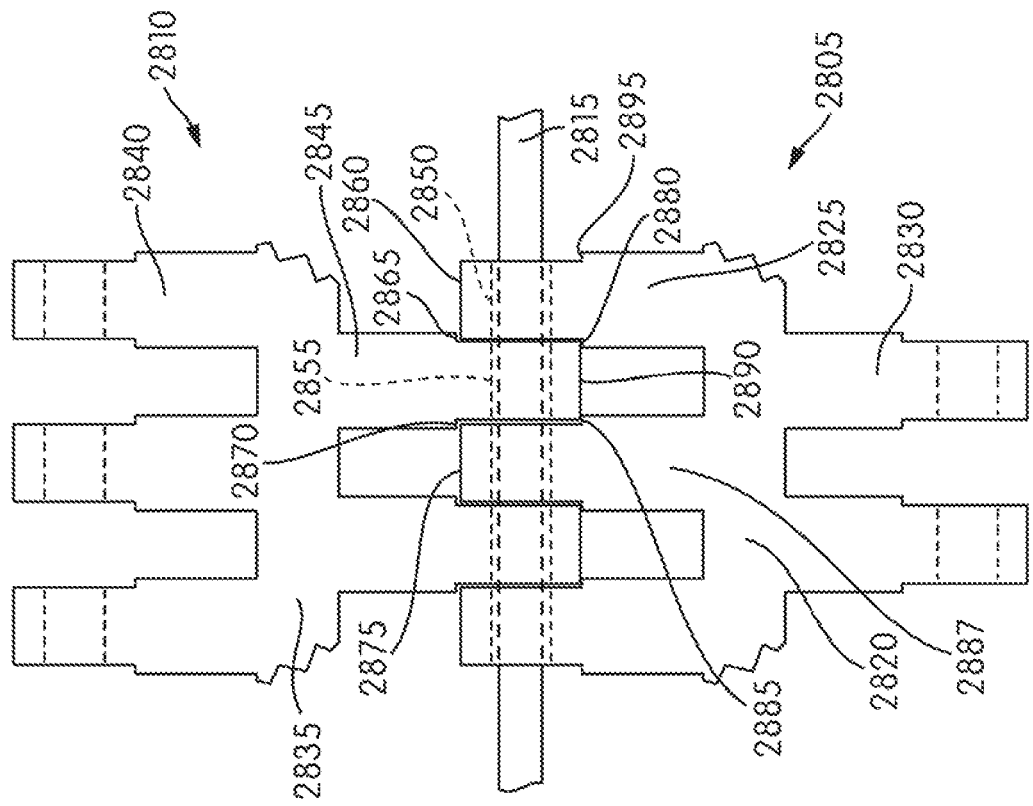
FIG. 30 is a plan view of another exemplary finger style conveyor belt embodiment including alignment features.

FIG. 30 illustrates an alternative embodiment similar to the embodiment shown in FIGS. 29 and 30. The embodiment shown in FIG. 30 includes additional shoulders forming additional contact surfaces 2880 and 2885 on forward extending link legs 2825 and 2887, which may be configured to abut a contact surface 2890 of rearward extending link leg 2845. Link leg 2825 may also include a shoulder forming a further contact surface 2895, which may be configured to abut a contact surface of a laterally adjacent link.

Figure 32:
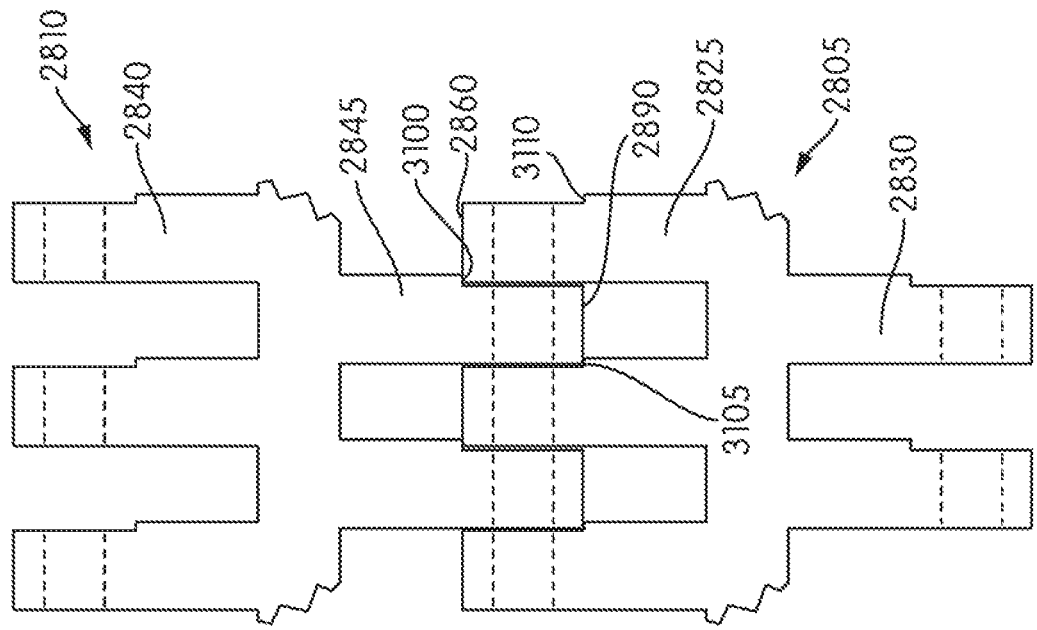
FIG. 32 is a plan view of another exemplary finger style conveyor belt embodiment including alignment features.
Figure 31:
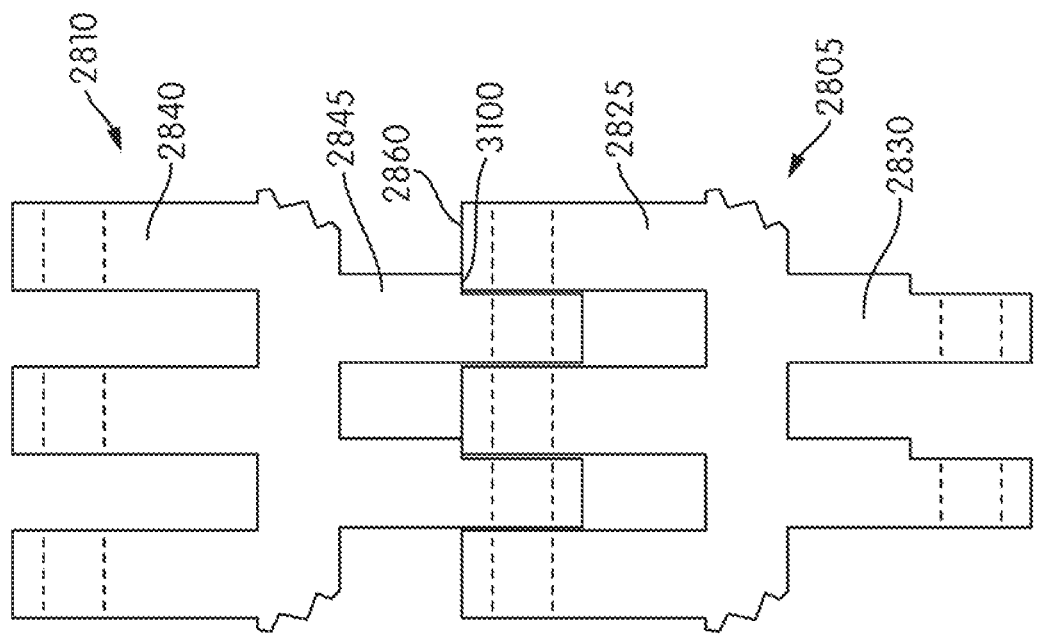
FIG. 31 is a plan view of another exemplary finger style conveyor belt embodiment including alignment features.

FIG. 31 shows a further alternative embodiment, wherein only rearward extending link legs include a single-sided contact surface 3100 configured to abut first contact surface 2860 of first link 2805. FIG. 32 also shows an asymmetrical configuration, wherein both rearward extending link legs of second link 2810 and forward extending link legs of first link 2805 may include shoulders forming contact surfaces, 3100 and 3105, respectively. Further, first link 2805 may also include a further contact surface 3110 for abutting laterally adjacent links. It should be understood that, in accordance with the embodiments shown in FIGS. 28-32, contact surfaces may be provided in longitudinally and/or laterally symmetrical or asymmetrical configurations.

The alignment features discussed herein may be used in many different types of conveyor belts and may be combined with other technologies intended to simplify the manufacturing of conveyor belts. For example, the rod retaining features mentioned above may be combined with the rod receiving aperture alignment features to both ease proper aligning of rod receiving apertures and insertion of the rod and, further, securely retain the connecting rods once inserted.

While various embodiments of the current embodiments have been described, the description is intended to be exemplary, rather than limiting and it will be apparent to those of ordinary skill in the art that many more embodiments and implementations are possible that are within the scope of the current embodiments. Accordingly, the current embodiments are not to be restricted except in light of the attached claims and their equivalents. Features of any embodiment described in the present disclosure may be included in any other embodiment described in the present disclosure. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to a method and/or process should not be limited to the performance of their steps in the order written, and one skilled in the art can readily appreciate that the sequences may be varied.

What is claimed is:

1. A conveyor belt comprising:
a first link having a first protrusion extending a first distance from a first surface of the first link, wherein the first protrusion includes a first mating surface, wherein the first mating surface is curved, wherein the first protrusion is disposed proximate a first rod receiving aperture extending through the first link;
a second link having a second protrusion extending a second distance from a second surface of the second link, wherein the second protrusion includes a second mating surface, wherein the second mating surface is curved, wherein the second protrusion is disposed proximate a second rod receiving aperture extending through the second link, wherein the first mating surface of the first protrusion receives and abuts the second mating surface of the second protrusion, the second link being restrained against movement in less than three orthogonal directions relative to the first link due to abutment of the first mating surface and the second mating surface, the first rod receiving aperture and the second rod receiving aperture being aligned when the first mating surface abuts the second mating surface; and
a connecting rod extending through the first rod receiving aperture of the first link and the second rod receiving aperture of the second link.

2. The conveyor belt of claim 1, wherein the first link and the second link are configured to travel in a longitudinal direction,
wherein the first mating surface has a first curvature and the second mating surface has a second curvature,
wherein the first curvature corresponds with the second curvature, and
wherein the first rod receiving aperture and the second rod receiving aperture are aligned in the longitudinal direction and an additional direction due to abutment of the first mating surface and the second mating surface, wherein the additional direction is orthogonal to the longitudinal direction.

3. The conveyor belt of claim 1, wherein the second mating surface is annular, and wherein the first mating surface partially extends about the second mating surface.

4. The conveyor belt of claim 1, wherein the first link and the second link are configured to travel in a longitudinal direction,
wherein the first protrusion is substantially aligned with the first rod receiving aperture in the longitudinal direction, and
wherein the second protrusion is substantially aligned with the second rod receiving aperture in the longitudinal direction.

5. The conveyor belt of claim 1, wherein the second protrusion at least partially surrounds the second rod receiving aperture.

6. The conveyor belt of claim 5, wherein the second protrusion continuously surrounds the second rod receiving aperture.

7. The conveyor belt of claim 1, wherein the first link is at least partially U-shaped to be at least partially defined by a first leg, a second leg, and a connecting portion between the first leg and the second leg of the first link,
wherein the first leg and the second leg extend substantially in a longitudinal direction, wherein the connecting portion extends substantially in a transverse direction, and
wherein the first mating surface substantially faces in a vertical direction that is substantially orthogonal to the longitudinal direction and the transverse direction.

8. The conveyor belt of claim 1, wherein the first link and second link are made from a plastic material.

9. A conveyor belt comprising:
a first link that is at least partially U-shaped to be at least partially defined by a first leg, a second leg, and a first connecting portion extending between the first leg and the second leg of the first link, the first link further including a first rod receiving aperture;
a second link that is at least partially U-shaped to be at least partially defined by a third leg, a fourth leg, and a second connecting portion extending between the third leg and the fourth leg of the second link, the second link further including a second rod receiving aperture; and
a connecting rod extending through the first rod receiving aperture of the first link and the second rod receiving aperture of the second link to connect the first link and the second link, the second connecting portion being received between the first leg and the second leg of the first link when the first link and the second link are connected,
wherein the first link and the second link are configured for movement in a longitudinal direction,
wherein the first link includes a first protrusion extending from a first surface of the first link, wherein the first protrusion includes a first mating surface, wherein the first mating surface is curved, wherein the first mating surface of the first protrusion receives and abuts a second surface of the second link to limit movement of the second link toward the first link in the longitudinal direction, and wherein the first mating surface of the first protrusion receives and abuts the second surface of the second link to align the first and second rod receiving apertures.

10. The conveyor belt of claim 9, wherein the second surface of the second link is defined on the second connecting portion of the second link.

11. The conveyor belt of claim 9, wherein the second link includes a second protrusion that extends from the second link, and wherein the second surface is defined on the second protrusion.

12. The conveyor belt of claim 11, wherein the second protrusion extends outwardly from the third leg generally away from the fourth leg.

13. The conveyor belt of claim 11, wherein the first protrusion is U-shaped.

14. A conveyor belt comprising:
a first link that is at least partially U-shaped to be at least partially defined by a first leg, a second leg, and a first connecting portion extending between the first leg and the second leg of the first link, the first link further including a first rod receiving aperture;
a second link that is at least partially U-shaped to be at least partially defined by a third leg, a fourth leg, and a second connecting portion extending between the third leg and the fourth leg of the second link, the second link further including a second rod receiving aperture; and
a connecting rod extending through the first rod receiving aperture of the first link and the second rod receiving aperture of the second link to connect the first link and the second link,
wherein the first link and the second link are configured for movement in a longitudinal direction,
wherein the first link includes a first protrusion extending from a first surface of the first link, wherein the first protrusion includes a first mating surface, wherein the first mating surface is curved,
wherein the first mating surface of the first protrusion receives and abuts a second surface of the second link to limit movement of the second link toward the first link in the longitudinal direction,
wherein the first mating surface of the first protrusion receives and abuts the second surface of the second link to align the first and second rod receiving apertures,
wherein the second surface of the second link is defined on the second connecting portion of the second link, and
wherein the second surface is curved and has a corresponding curvature to the first mating surface.

15. The conveyor belt of claim 14, wherein the first protrusion extends inwardly from the first leg generally toward the second leg.

16. A conveyor belt comprising:
a first link having a first protrusion extending a first distance from a first surface of the first link, wherein the first protrusion includes a first mating surface, wherein the first mating surface is curved, wherein the first protrusion is disposed proximate a first rod receiving aperture extending through the first link;
a second link having a second protrusion extending a second distance from a second surface of the second link, wherein the second protrusion includes a second mating surface, wherein the second mating surface is curved, wherein the second protrusion is disposed proximate a second rod receiving aperture extending through the second link, wherein the second mating surface and the first mating surface abut to align the first rod receiving aperture and the second rod receiving aperture, wherein the second mating surface and the first mating surface have corresponding curvature, the second link being restrained against movement in less than three orthogonal directions relative to the first link due to abutment of the first mating surface and the second mating surface; and
a connecting rod extending through the first rod receiving aperture of the first link and the second rod receiving aperture of the second link.

17. The conveyor belt of claim 16, wherein the second mating surface is annular, and wherein the first mating surface partially extends about the second mating surface.

18. The conveyor belt of claim 16, wherein the first link and the second link are configured to travel in a longitudinal direction,
wherein the first protrusion is substantially aligned with the first rod receiving aperture in the longitudinal direction, and
wherein the second protrusion is substantially aligned with the second rod receiving aperture in the longitudinal direction.

19. The conveyor belt of claim 16, wherein the first link is at least partially U-shaped to be at least partially defined by a first leg, a second leg, and a connecting portion between the first leg and the second leg of the first link,
wherein the first leg and the second leg extend substantially in a longitudinal direction, wherein the connecting portion extends substantially in a transverse direction, and
wherein the first mating surface substantially faces in a vertical direction that is substantially orthogonal to the longitudinal direction and the transverse direction.

20. The conveyor belt of claim 16, wherein the first link and second link are made from a plastic material.

\* \* \* \* \*